(12) United States Patent
Batty et al.

(10) Patent No.: US 8,845,865 B2
(45) Date of Patent: Sep. 30, 2014

(54) CONTROLLED-GRADIENT, ACCELERATED-VAPOR-RECOMPRESSION APPARATUS AND METHOD

(71) Applicant: Purestream Services, LLC, Salt Lake City, UT (US)

(72) Inventors: J. Clair Batty, North Logan, UT (US); Neil W. Richardson, Salt Lake City, UT (US); David A. Bell, Farmington, UT (US); Christopher M. Miller, Pleasant Grove, UT (US)

(73) Assignee: Purestream Services, LLC, Salt Lake City, UT (US)

( * ) Notice: Subject to any disclaimer, the term of this patent is extended or adjusted under 35 U.S.C. 154(b) by 0 days.

(21) Appl. No.: 13/756,346

(22) Filed: Jan. 31, 2013

(65) Prior Publication Data

US 2013/0186741 A1 Jul. 25, 2013

Related U.S. Application Data

(63) Continuation-in-part of application No. 13/372,182, filed on Feb. 13, 2012, and a continuation-in-part of application No. 12/687,753, filed on Jan. 14, 2010, now Pat. No. 8,425,666, and a continuation-in-part of application No. 12/687,746, filed on Jan. 14, 2010, now Pat. No. 8,425,664, and a continuation-in-part of application No. 13/372,232, filed on Feb. 13, 2012, and a continuation-in-part of application No. 13/372,276, filed on Feb. 13, 2012.

(60) Provisional application No. 61/594,285, filed on Feb. 2, 2012, provisional application No. 61/443,245, filed on Feb. 15, 2011, provisional application No. 61/144,694, filed on Jan. 14, 2009, provisional application No. 61/144,665, filed on Jan. 14, 2009.

(51) Int. Cl.
*B01D 3/00* (2006.01)
*B01D 1/00* (2006.01)
*B01D 1/28* (2006.01)
*B01D 1/30* (2006.01)
*F28D 21/00* (2006.01)

(52) U.S. Cl.
CPC .............. *B01D 3/007* (2013.01); *B01D 1/0082* (2013.01); *F28D 21/0001* (2013.01); *B01D 1/2856* (2013.01); *B01D 1/30* (2013.01); *B01D 1/2818* (2013.01)
USPC ................... 203/21; 203/24; 203/26; 203/27; 203/39; 203/87; 159/24.1; 159/47.1

(58) Field of Classification Search
USPC .......................................................... 95/251
See application file for complete search history.

(56) References Cited

U.S. PATENT DOCUMENTS 3,000,795 A 9/1961 Goeldner
4,441,963 A 4/1984 Li (Continued)

OTHER PUBLICATIONS

Stilmas Documentation and Validation, Vapor Thermo-Compressor Stills, Apr. 9, 2011.

*Primary Examiner* — Duane Smith
*Assistant Examiner* — Phillip Shao
(74) *Attorney, Agent, or Firm* — Pate Baird, PLLC

(57) ABSTRACT

An accelerated vapor recompression apparatus 10 converts incoming flow 35a to a concentrate 35c by developing a concentration profile 146 within a tank 30 holding a liquid 23 containing dissolved solids. The resulting curve 160 of saturation temperature of the stratified liquid 23 (such as a brine 23 or other material 23) moves away from the curve 162 corresponding to fully mixed conditions. The shift 174, 180 in saturation temperature results in increased boiling without increased energy from a heater 70 or compressor 50. A method 90, 200 of control of the system provides interventions 203, 204, 205, 206 at different levels 92, 94, 96, 98 of control, ranging from mass flows 35 to work of a compressor 50, heat from a heater 70, and a predictive processing 215 of feedback 217 for controlling commands 216 algorithmically.

10 Claims, 16 Drawing Sheets

(56) References Cited

U.S. PATENT DOCUMENTS

| | | | |
|---|---|---|---|
| 6,355,145 B1 * | 3/2002 | Kresnyak et al. ............. 203/1 |
| 6,551,466 B1 * | 4/2003 | Kresnyak et al. ............. 203/1 |
| 6,733,636 B1 | 5/2004 | Heins |
| 6,931,880 B2 | 8/2005 | Aflekt et al. |
| 7,837,768 B2 | 11/2010 | Sanderson et al. |
| 7,842,121 B2 | 11/2010 | Sanderson et al. |

* cited by examiner

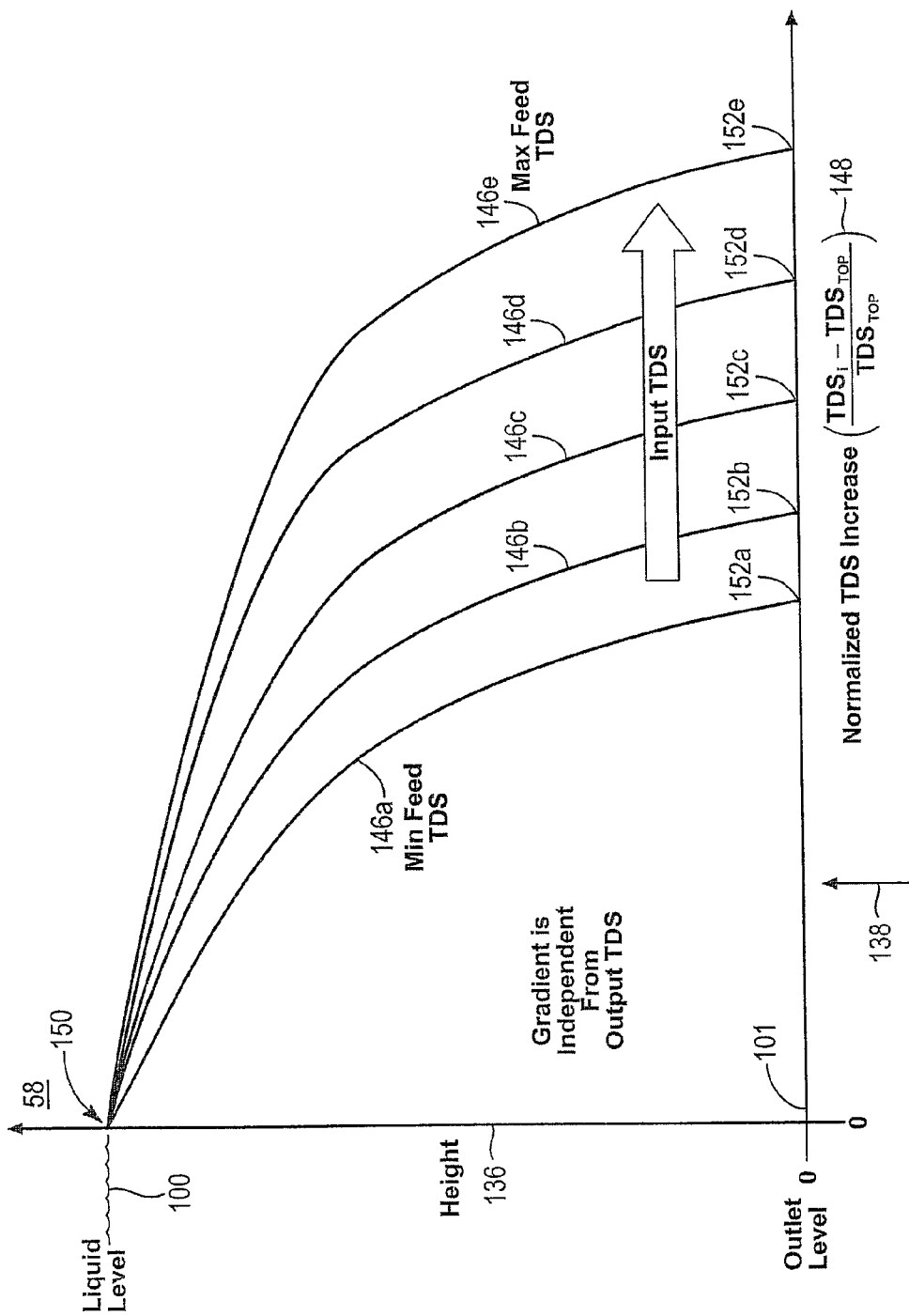

RAOULT'S LAW $$T_{sat\ Brine} = T_{sat\ H_2O} + \Delta T_{sat\ Brine} \quad \underline{182}$$

$$\Delta T_{sat\ Brine} = i k_b m_{solution}$$

Where  i = Ionic constant (e.g., 2.0 - 1.9 for NaCl)
  $k_b$ = Ebullioscopic constant (e.g. ~ 0.512 °C kg/mole for water)
  m = Molality of brine (below 50%; moles TDS/kg water)

FIG. 7B

CLAUSIUS-CLAPEYRON EQUATION $$\frac{dP}{dT} = \frac{L}{T\Delta v} \quad \underline{184}$$

$$\Delta P = P_\infty (e^{-m} - 1)$$

$$m = \frac{L}{R}\left(\frac{L}{T_2} - \frac{L}{T_1}\right)$$

L = Latent Heat
P = Pressure
T = Temperature
R = Gas Constant
v = Specific Volume
$\Delta v$ = Vg

FIG. 7C

DALTON'S LAW

186

$$P_{total} = p_1 + p_2 + \cdots + p_n$$

$p_1 = P_{total} + y_i$ $y_i$ = Mole fraction of ith component in a mixture of n components $p_i$ = Partial pressure of component i

FIG. 7D

HENRY'S LAW

188

$$p_i = k_H c_i$$

$p_i$ = Partial pressure of the solute in the gas $c_i$ = Concentration of the solute $k_H$ = Henry's Law constant (L · atm/mol)

FIG. 7E

CONTROLLED-GRADIENT, ACCELERATED-VAPOR-RECOMPRESSION APPARATUS AND METHOD

RELATED APPLICATIONS

This application: claims the benefit of U.S. Provisional Patent Application Ser. No. 61/594,285, filed Feb. 2, 2012; is a continuation in part of U.S. patent application Ser. No. 13/372,182, filed on Feb. 13, 2012, which claims the benefit of U.S. Provisional Patent Application Ser. No. 61/443,245, filed on Feb. 15, 2011; is a continuation in part of U.S. patent application Ser. No. 12/687,753, filed on Jan. 14, 2010, which claims the benefit of U.S. Provisional Patent Application Ser. No. 61/144,694, filed on Jan. 14, 2009; is a continuation in part of U.S. patent application Ser. No. 12/687,746, filed on Jan. 14, 2010, which claims the benefit of U.S. Provisional Patent Application Ser. No. 61/144,665, filed on Jan. 14, 2009; is a continuation in part of U.S. patent application Ser. No. 13/372,232, filed on Feb. 13, 2012, which claims the benefit of U.S. Provisional Patent Application Ser. No. 61/443,245, filed on Feb. 15, 2011; and is a continuation in part of co-pending U.S. patent application Ser. No. 13/372,276, filed on Feb. 13, 2012, which claims the benefit of U.S. Provisional Patent Application Ser. No. 61/443,245, filed on Feb. 15, 2011; all of which are herein incorporated by reference in their entirety.

BACKGROUND

1. The Field of the Invention

This invention relates to heat transfer and, more particularly, to novel systems and methods for vapor recompression.

2. The Background Art

Heat recovery is the basis of electrical co-generation plants Likewise many food and beverage processes require heat recovery for economy. Meanwhile, desalination plants, sugar processing, distillation systems, and the like rely on recovery of latent heat in order to minimize net energy requirements. Heat may be recovered by reheating, pre-heating, or otherwise exchanging heat from an exit flow into and incoming flow through a system of heat exchangers.

Vapor recompression is used in various forms as one method for heat recovery. For example, in food processing, industrial waste processing, oil production brine processing, and the like, vapor recompression relies on conventional heat exchangers and technologies to exchange heat, vaporize liquids, and condense distillates. The chemical constitution of dissolved materials, especially dissolved solids, as well as various ions and the like take a toll in energy and damage to the processing equipment for energy exchange.

For example, oil production results in pumping considerable water to the surface. That water often contains some amount of hydrocarbons, salts, methane, ammonia, trace elements, or a combination thereof. Therefore the water cannot be released into other water flows without treatment. Meanwhile, disposal by hauling, followed by re-injection, or evaporation by ponds or boilers, is expensive.

Industrial waste, distillation process in food and beverage industries and the like have similar, if not always so severe, problems. Even the latest methods such as vapor recompression and multiple-effect distillation struggle with efficiency, energy budgets, and equipment maintenance in the face of corrosion, fouling, scaling, and so forth. Better systems are needed for heat recovery and re-use.

SUMMARY OF THE INVENTION

In view of the foregoing, in accordance with the invention as embodied and broadly described herein, a method and apparatus are disclosed in one embodiment of the present invention as including a controlled gradient of a material, such as, for example, total dissolved solids (TDS) in a boiling liquid column, such as a brine. Adjacent columns contain condensing vapors at an increased pressure. High heat transfer coefficients and effective stratified densification of the liquid are obtained by controlling mass flows, work, heat and the like, and sensing and controlling predictively based on balancing mass, work, energy, and the rates of change thereof, include rates of change in the rates of change (second derivatives of values).

In one embodiment of the method in accordance with the invention, a system may operate by providing a feed comprising a liquid containing a first material, distinct from the liquid and dissolved therein, and containing the feed as a pool. A core at least partially immersed in the pool may be in thermal communication therewith and sealed against direct fluid communication therewith.

One may create a concentration profile reflecting a variation of the concentration of the first material in the pool between a liquid level at the top thereof and the bottom thereof by recycling vapor produced in the pool into a condensate within the core. Typically, a container containing the feed is selected from a pond, a tank, an estuary, and a vessel, and the pool is quiescent relative to the feed.

The core may further comprise closed channels in thermal communication with the pool, in indirect fluid communication therewith, and sealed against direct fluid communication therewith, which may be oriented to flow the vapor and condensate in a vertical direction. Controlling accretion of compositions containing the first material may be done by selecting the attitude of the core in operation.

The portion of the pool within the core may be engaged in confined boiling, and the profile (which may be thought of as gradient, but is not necessarily monotonic or linear) is effected by establishing an exchange of heat from the core into the pool. A change in phase of the liquid within the core, by confinement therein vaporizes the liquid during the heat transfer from the core.

Optimizing the concentration profile may be done by providing a plurality of panels and selecting a spacing therebetween for enclosing therebetween, in at least two dimensions, a portion of the pool. For example, this may include providing a plurality of panels and selecting a spacing therebetween for enclosing therebetween, in at least two dimensions, a portion of the pool. Spacing may be based on the characteristics of the feed.

The method may include selecting at least one of a spacing between panels of the plurality of panels, a number of the panels in the core, a size of the panels, material of the core, attitude of the core, other characteristics of the panels, and the position of the core in the pool, and a combination thereof based on the characteristics of the feed.

Operation of the system and method establishes an active region proximate the core and containing a substantial majority of the variation in the concentration profile, and establishes a trap region below the active region, which is substantially excluded from exchanging liquid into the active region.

Optimizing heat transfer may be done by fully immersing the core into the pool, and controlling or changing an effective nucleate boiling region of the core by changing the concentration profile. Changing a temperature profile in the pool by adding heat corresponding to a change in a pressure above the pool may be done, and may be balanced with work by the compressor to obtain stability at a set of conditions desired.

In one embodiment of a method in accordance with the invention, a process may include changing a temperature profile in the first region by adding heat based on a change in a pressure above the first region. Changing a boiling region of the core may be effected by changing the concentration profile, which may be used to change the effective saturation temperature, pressure, or both for the liquid. The pool may be quiescent relative to the feed, meaning that flows are generally comparatively slower, with turbulence only local, and not general.

One embodiment of an apparatus in accordance with the invention, may include a containment means adapted for receiving a feed comprising a liquid containing a first material distinct from the liquid and dissolved therein. The containment means may be configured to contain a collection of the feeds as a pool having a liquid level and a bottom level. A core may be at least partially immersed in the pool to be in thermal communication therewith and sealed against direct fluid communication therewith.

Means for processing the pool may create a concentration profile reflecting a variation in concentration of the first material in the pool between the liquid level and the bottom. This processing means may further comprise compression means recycling vapor produced in the pool into a condensate within the core, and may include heating means (such as a heater, for example) for adding thermal energy into the pool. The processing means may include a compressor, which is one embodiment of a recycling means for recycling vapor produced in the pool into a condensate within the core.

Containment means may be selected from a pond, a tank, an estuary, a vessel, or the like. The core may include closed channels in thermal communication with the pool, in indirect fluid communication therewith (e.g. to receive vapor), and sealed against direct fluid communication therewith. The core may be movable, for moving relative to the containment means. When the core is engaged in confined boiling, moving may be used to adjust spacing between panels of the core. Moving the core may include changing the orientation of it, changing a spacing between the closed channels, or the like.

In one embodiment of an apparatus in accordance with the invention, configured as a heat exchanger suitable for use in a medium configured as a fluid, the heat exchanger may include an inlet, outlet, and surfaces. Surfaces may include an exterior surface and an interior surface, defining an interior volume in fluid communication with the inlet and the outlet.

The surfaces may be constructed of a material selected to have a thermal resistance for optimizing heat transfer from the interior volume into the medium (fluid). The material's properties considered may include a coefficient of thermal expansion effective to maintain the geometric structural integrity of the surfaces, effective to be stable in an environment comprising the medium, effective to minimize nucleation during boiling of the medium thereagainst, or a combination thereof.

The inlet may conduct a recycled vapor, generated against the exterior surface, into the interior volume, the exterior surface conducting heat from the interior volume into a boundary layer formed by the exterior surface when contacted by the medium. For example, the material may be selected from the group consisting of metals, polymers, composites, and a combination thereof. One suitable polymer is a fluorocarbon polymer, such as a tetrafluoroethylene (e.g. polytetrafluoroethylene).

The material may selected to be chemically inert and non-reactive with respect to the medium. It may also be selected to minimize accretion of compounds generated in the medium.

A method for improving a process for vapor recompression, may include selecting a process comprising a plurality of operations combinable as sub units to effect the process. Determining a concentration profile of a material dissolved in a source of the vapor may be done in conjunction with determining an influence on the concentration profile. This may be done by evaluating at least one operation of the plurality of operations having a set of operational parameters.

Selecting a target operation from the plurality of operations may be based on that evaluating. Selecting a control parameter for controlling the target operation, one may begin manipulating the concentration profile by modifying the control parameter. The control parameter may be selected from the group consisting of a mass flow, mechanical work, thermal energy, thermal inertia, a rate of change thereof, and a combination thereof for certain embodiments. In other embodiments a larger group may be considered Evaluating may consist of evaluating in sequence a pump moving liquids in the process, a compressor compressing the vapor from the source, and a heater adding heat to the source. It need not include more than those actions, but could include evaluating the response time of the source (e.g., thermal inertia).

In one embodiment, evaluating may also be sequentially and in an order of first, a pump for moving liquids in the process, second, a compressor for compressing the vapor from the source, and third, a heater for adding heat to the source. These may be evaluated when actually moving liquids, compressing the vapor from the source, and adding heat to the source.

The method may include analyzing the feed for at least one of the constituents therein, time variance of the constituents, a source of supply, delivery mechanisms, and the like. The method may include modifying a control corresponding to at least one of a pump, a compressor, a heater, and a combination thereof. It may also include providing sensors to detect at least one of a temperature, pressure, flow rate, power, and concentration corresponding to an operation within the process. It may beneficially include determining an ambient condition selected from pressure, temperature, wind, humidity, and a combination thereof.

Evaluating may include determining substantially all (or all) energy inputs into and energy outputs from the process. The method may thus include balancing substantially all inputs of energy into and outputs of energy from the process. It may add an energy recovery operation providing energy transfer with respect to at least one of the operations.

In certain embodiments, a method of removing a contaminant from a carrier may include selecting a liquid operating as a carrier. A contaminant found in the carrier may be selected or targeted for removal, reduction, or concentration. A circuit making up a vapor re-compression cycle may have a first region containing nucleate boiling. Introducing into the circuit the carrier containing the contaminant, one may establish in the first region a concentration gradient of the contaminant. Controlling the first region may be accomplished by manipulation of the concentration gradient. The result may include returning a condensate, the carrier containing less than some pre-determined concentration of the contaminant.

The system and method may also return from the first region a brine concentrating the contaminant. At least one of the condensate exiting the cycle and a vapor within the cycle may be substantially devoid of the contaminant. One or more of the condensate, vapor, and brine may serve as a feedstock for a subsequent "unit operation" as that term is understood in the chemical engineering art.

The feedstock may provide one or more benefits. It may serve as a precursor for a chemical reaction in the subsequent unit operation. It may be sold as a solid or fluid having independent economic value in some market for such commodities. Likewise, it may be further processed to provide a constituent, derivable from the fluid, and having independent value in the marketplace. In some embodiments, the fluid may be reusable directly for recycling in a source process that provided the carrier to the circuit initially. The feedstock or output of the circuit may provide increased operational efficiency for a disposition process disposing of that output, reduction of environmental impact of the contaminant; improvement in a compliance process in satisfaction of at least one of a governmental regulation, industry standard, health standard, safety standard, and a contractual requirement, or a combination thereof.

A subsequent unit operation may be or include synthesis of hydrochloric acid, synthesis of another acid, hydrolysis, electrolysis, an ion exchange operation; an osmotic separation process, a vaporization separation process, coagulation, other chemical separation process, centrifugation, filtration, sluicing, settling, flocculation, and another mechanical separation process, microwave separation, another microwave treatment, re-injection into a well, a geologic fracturing operation, blending with another material, reacting chemically with another material, or a combination thereof.

The contaminant may also be or include a dissolved solid, suspended solid, hydrocarbon, salt, heavy metal, other metal, volatile organic compound, other organic compound, oxide of nitrogen, other nitrogenous compound, alcohol, oxide of sulfur, other sulfurous compound, calcium compound, halide, other ion, acid, base, or some combination thereof.

The circuit may include modules for effecting the circuit. For example, a specification defining a system may call out a plurality of the modules, each module implementing an instance of the circuit and its unit operations. One may size the system to match a source of the contaminant and provide the plurality of modules, operating together as the system, and in numbers selected based on an output to be treated from the source.

Methods may include providing a requirement, pre-determined and corresponding to a source of the contaminant, defining a system having a plurality of the modules, each module having a type and implementing at least one function specified by the requirement, and then selecting a value, a number of modules of each type to be included in the system as selected components. The system may then be configured by connecting the selected components.

The method of claim 6, wherein each module of the modules is mounted on a connecting structure and sized to be commercially transportable in accordance with transportation limitations provided by regulation. It may include assembling a facility in a pre-determined configuration by connecting the connecting structures to one another and rendering the modules interoperable.

A method of separating out a material contained in a liquid may include providing, from a source, a liquid operating as a carrier containing a material targeted for separation from the liquid. It may provide a circuit constituting a vapor re-compression cycle having a first region containing nucleate boiling and a second region containing vapor condensation. By introducing into the circuit the liquid, the method may establish in the first region a concentration gradient of the material in the liquid. Controlling the nucleate boiling may be done by manipulation of the concentration gradient.

Methods may include returning from the second region a condensate comprising the liquid containing less than a pre-determined concentration of the contaminant, and may returning from the first region a brine. At least one of a condensate, a portion of the vapor, and a brine, may contain the material, and another thereof be substantially devoid of the material. Providing a feedstock may be constituted by at least one of a condensate separated from the material, a vapor separated from the material, a brine into which the material has been concentrated, and a solid comprising the material. A the outputs may be used as a feedstock sent to a subsequent unit operation.

A system in accordance with the invention may include a circuit for processing fluids by vapor re-compression, the circuit comprising an evaporation region. A working fluid may circulate through the circuit. A material contained within the working fluid may be targeted for separation therefrom. An evaporator, controllable by an operator, may be located within the evaporation region, and provide control of nucleate boiling by establishing and manipulating a concentration gradient of the material in the evaporation region.

The system may be made up of modules constituting the circuit, wherein each module is mounted on a connecting structure and sized to be commercially transportable in accordance with transportation limitations provided by regulation. Modules may be connectable (and ultimately connected) and interoperable in a pre-determined configuration when the connecting structures are secured to one another.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 6 is a chart of curves illustrating the normalized total dissolved solids increase in the concentration gradient or density gradient of the tank of FIG. 5, in a system of FIG. 1;

FIG. 7B is a description of Raoult's Law governing saturation temperature in impure liquids, such as production brine;

FIG. 7C is a description of the Clausius-Clapeyron equation describing the change of temperature in a vapor across a compressor increasing the pressure on that vapor;

FIG. 7D is a description of Dalton's Law of partial pressures in a vessel containing multiple gasses;

FIG. 7E is a description of Henry's Law governing the concentration of absorbed non-condensable gasses as a function of pressure contribution of those gasses above a liquid in equilibrium;

DETAILED DESCRIPTION OF THE PREFERRED EMBODIMENTS

Figure 1:
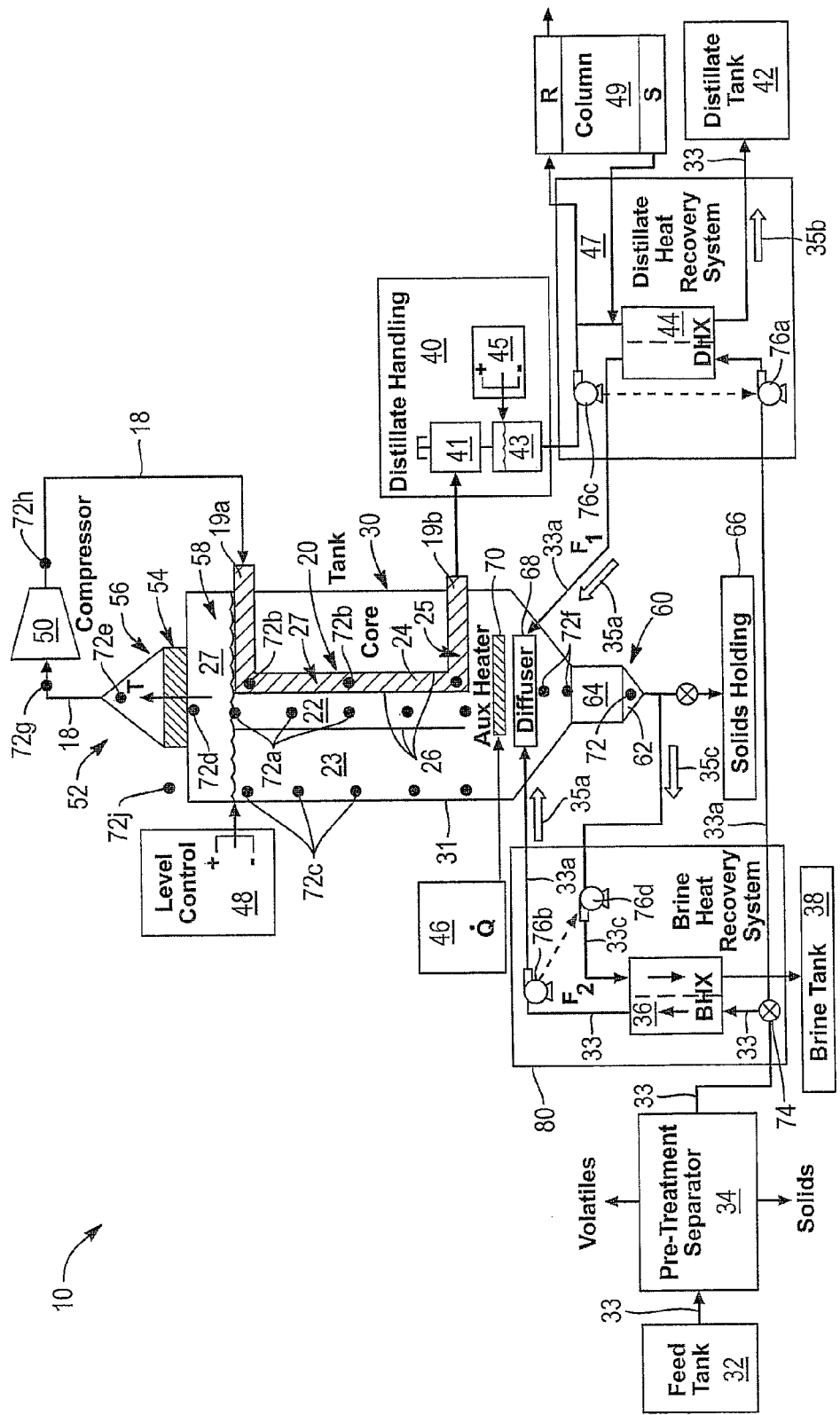
FIG. 1 is a schematic block diagram of a controlled-gradient, vapor-recompression system in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

As used herein, terms are to be understood and interpreted broadly. However, alternative, specific terms may be used by way of example, but are to be interpreted as meaning the broader terms. For example a solvent or liquid is exemplified by water, but may be interpreted as any solvent, liquid, material, medium, carrier, or the like. Similarly, many materials may be dissolved as solutes in such a carrier. Solutes may be called contaminants herein; contaminant simply refers to something to be separated out, even a desirable material as in distillation. A solvent or liquid may be thought of as any fluid to be treated by a separation process in accordance with the invention.

Solutes may be liquids, solids, ions, synthetic, natural, mineral, animal, vegetable, or other materials dissolved in the solvent or carrier. Thus, the term TDS is an example standing for a solute generally, dissolved in the carrier as its solvent. Solutes and solvents may arise in food processing, industrial process fluids or wastewater, alcohol distilleries, sugar processing, petroleum drilling or production fluids, potable water processing, mining effluent or tailings processing, nuclear coolant or waste liquids processing, runoff or other collection pond handling, or the like. Brine stands for any solution of solute in a solvent, even though it is an example term commonly applied to dissolved solids and ions in water.

Core materials may be any suitable materials ranging through metals, alloys, stainless, polymers, elastomers, other materials, composites, or combinations thereof. The core may have bellows structures to change spacing between panels, or other variations supporting positioning, pivoting, tilting (e.g., attitude of roll, pitch, or yaw around any axis), sliding, or otherwise optimizing configurations of core panels by positioning. Such may be useful in processes such as vapor recompression, evaporator distillation systems, multiple-effect evaporators, and other processing systems, even though otherwise difficult in some industrial situations.

The core described herein is not a 'radiator' like an automobile uses, for several reasons. For example, air through such a radiator is a flow completely unrelated to the cooled liquid contained. In contrast, vapor recompression passes a vapor phase boiled off a liquid phase, through a compressor and back to condense against the outside of the very wall containing the boiling.

Quiescent is comparative between flows, and does not mean a complete lack of flow or motion, but rather a much slower motion than the flow compared with it and conventional flows for the function. Nucleate boiling is not limited to boiling initiated at surface nucleation points, but boiling due to exceeding the vapor pressure. Confined boiling is a term of art in the art of heat transfer and is used in its ordinary meaning therein. It is also understood to mean nucleate boiling in a space confined in at least one dimension.

Likewise, fluids include all gases, vapors, liquids, and liquidous flows. Systems or devices in thermal or fluid communication mean the systems are capable of exchanging heat or fluid, respectively. Containment for fluids may include anything natural or artificial, from ponds, lakes, rivers, and other estuaries to lined ponds, tanks, containers, pipes, conduits, or the like.

By gradient is meant a profile (a variation in one variable, like temperature or concentration, with respect to another, like space or time). It need not be linear, nor monotonic (changing always in a single direction). The profiles often tend in one direction, with localized variation due to the dynamics of the system. Typically, a profile changes more dramatically in an active region (region where heat transport, mass transport, or both are actively occurring between flows, and not just flowing through some containment from one location to another). A dynamic gradient or dynamic profile is a profile established by operation of the invention, and subject to localized variations, variations with time or conditions, or a combination thereof.

Referring to FIG. 1, while referring generally to FIGS. 1-12, a system 10 in accordance with the invention may be set in a permanent installation, or may be containerized. The basic elements of system 10 may include a tank 30.

In the illustrated embodiment, the tank 30 contains a brine 23 that has established therein a gradient of concentration of the dissolved solids. The tank 30 is fed originally by a feed tank 32 through lines 33. In general, herein, any reference to an item by reference numeral includes a generalized inclusion of such items bearing such a number. A trailing letter after a reference numeral indicates a specific instance of the item designated by the reference numeral. Thus, the system 10 includes a plurality of lines 33, including, for example, lines 33a, 33b, 33c, and so forth.

The feed tank 32 provides through lines 33 to a separator 34 a flow 35. The flow 35 is typically pre-treated in the separator 34. In one embodiment, the separator 34 may be configured as a pre-treatment system for removal of volatile materials, for example.

In one embodiment of a method in accordance with the invention, the system 10 may be used by introducing a brine 23 in an unconcentrated state into the feed tank 32. This may come directly from a well head, or may be hauled to a particular location from various petroleum production facilities.

In the illustrated embodiment, the feed tank 32 may then transport the brine through a line 33 to a pre-treatment system 34, which typically will operate as volatiles separator 34. Other processes of pre-treatment systems 34 may include adding various chemicals in order to reduce fouling, scale, corrosion, and the like.

For example, brine received in a feed tank 32 may include numerous materials. Dispersed oil products are typically volatiles that vaporize upon heating. These may include fractions of crude oil that range from C6 to waxes, tar, paraffin, as well as paraffin soluble organic compounds. Gasoline and diesel ranges of organic hydrocarbons may be included in small amounts. Likewise, various aromatics, such as polycyclic aromatic compounds may be included. BTEX compounds are not uncommon. Likewise, methanol, phenols, and methane may similarly be included.

Not only those organic hydrocarbons but likewise sulfur in various forms, including hydrogen sulfide ($H_2S$) may be included. These may be particularly problematic since sulfates are likely to permanently scale out on solid surfaces. In order to reduce the scaling by sulfates, scale inhibitors must be introduced into the brine 23 to maintain a clean feed tank 30. These are not necessarily required, but are highly recommended for brines 23 that contain compounds of sulfur.

Similarly, silica, clay, and other inorganic materials may be included in large or small amounts, dissolved, or undissolved. Typically, silica and clay are undissolved, and may form particulates. Likewise, various salts. Salts may include cations ranging through magnesium, calcium, sodium, and potassium. The anions, which may correspond to the aforementioned cations may include chlorides, sulfates, carbonates, nitrates, and the like. Typically, nitrates are not present in large concentrations. Nevertheless, carbonates are typically received in brines 23 in comparatively large or larger quantities.

Treatment chemicals added in the pre-treatment system 34 may include, for example, ammonium, various compounds of nitrogen, gels, foam generating materials, and the like. Similarly, additional ions may include strontium, mercury, lead, chromium, selenium, iron, barium, and so forth. Various naturally occurring radioactive materials such as uranium, radium, and the like may be included. Boron is not all that uncommon.

In some embodiments, various types of separators 34 may be placed to remove other entrained materials, whether solid, gas, liquid, or the like. Such pre-treatment systems 34 are numerous and ubiquitous in the science of pre-treating production brines.

For example, Sears, in U.S. Pat. No. 5,968,321, issued Oct. 19, 1999 and entitled Vapor Compression Distillation System and Method, which is incorporated herein by reference, discloses a distillation system that includes a pre-treatment process and apparatus. Similarly, Kresnyak, et al., in U.S. Pat. No. 6,355,145 B1 issued Mar. 12, 2002 and entitled Distillation Process with Reduced Fouling, which is incorporated herein by reference, likewise discusses various processes for pre-treatment.

From the pre-treatment system 34 or separator 34, the flow 35 first passes through a heat exchanger 36, referred to as a brine heat exchanger. The function of the brine heat exchanger is to remove heat from brine 23 leaving the tank 30, and to recover that heat into the flow 35 passing into the tank 30.

Ultimately, the concentrated brine from which heat is extracted by the brine heat exchanger 36 is disposed of in a brine tank 38. The brine tank 38 may be emptied by hauling the brine away, passing the brine into an evaporation pond, further processing the brine for minerals, heating or otherwise drying the brine, or other disposition method.

In the illustrated embodiment, a distillate handling system 40 operates opposite the brine heat exchanger 36 and brine tank 38. That is, for example, the distillate handling system receives the distilled water as an output from the system 10, and specifically from the tank 30 where it has been boiled off. The distillate handling system 40 may include a vapor trap 41. The vapor trap 41 may be simple or complex and typically operates like a liquid trap (e.g., P trap) in which a column of liquid is contained within a line 33 that traverses both down and back up in order to maintain a liquid column that cannot be overcome by the pressure of incoming vapor.

The distillate tank 42 operates to collect all the distillate that has been condensed from the closed channels 24 of the core 20. However, as a practical matter, particularly in consideration of control issues, a distillate reservoir 43 may first receive the distillate from the vapor trap 41. Accordingly, the distillate reservoir 43 may be used for testing the level or rate of generation of distillate.

Following collection in the distillate reservoir 43, the distillate may next pass to a heat exchanger 44 configured to extract heat from the distillate, and pass that heat into the feed input line 33a feeding into the tank 30. In the illustrated embodiment, the distillate heat exchanger may operate at a fixed rate of flow in both directions.

For example, the brine feeding from the feed tank 32 may be divided between feeds F1, passing through the distillate heat exchanger 44, and F2, passing through the brine heat exchanger 36. Thus, F1 receives heat from the distillate, preheating as close as reasonable to the temperature of the brine 23 in the tank 30. Likewise, feed passing from the feed tank 32 through the brine heat exchanger 36 extracts heat from brine exiting at maximum concentration from the tank, toward the brine tank 38. This preheating of F1 and F2 elevates feed temperatures and recovers heat that would otherwise be discharged in the distillate tank 42 and the Brine Tank 38, respectively.

In the illustrated embodiment, the distillate handling system 40 includes a level control 45. The level control 45 operates by sensing the level of distillate in the reservoir 43. According to the output of the level control 45, the system 10 may be adjusted in certain operating parameters in order to maintain a constant flow of distillate.

In the embodiment of the illustration, it is contemplated that the distillate outflow to the distillate tank 42 from the distillate handling system 40 through the distillate heat recovery system 47, will be operated at a fixed rate. One benefit of an apparatus and method in accordance with the invention is that the output rate of distillate may be fixed. Likewise, the incoming brine mass flow rate may be fixed in the flow 35, divided between the flows F1, F2, regardless of the brine concentration incoming from the feed tank 32, and regardless of the brine concentration level discharged into the brine tank 38.

Various embodiments of level controls 45 may be implemented. For example, FIG. 2C hereinafter describes one level control mechanism suitable for operating between a vapor compartment and a liquid compartment or a vapor region and a liquid region within a tank, while still providing accurate, repeatable, reliable readings, without the need for vents and other condensate removal systems from the vapor side of the gauge.

The energy sources for evaporation of the brine 23 in the tank 30 comes from multiple sources. As a practical matter, an auxiliary heat source 46 provides heat to supply the brine 23 in order to elevate the temperature within the tank 30 to the proper level. Meanwhile, the brine heat exchanger 36 and distillate heat exchanger 44 recover heat from exit streams in order to elevate the temperatures of F2 and F1, respectively, entering the tank 30.

Thus, the distillate heat recovery system 47 is a source of heat recovered into the line 33*a*, as the brine heat recovery system 80 is a source of recovered heat into the flow 35*c* in the line 33*a*. Other heat recovery systems such as engine exhaust recovery may also be employed. Actual sources of heat will typically include only a heater 70 providing heat from an auxiliary source 46, which operates merely to overcome losses in the system.

The tank 30, may include a level control 48, which may be similar, or completely different from the level control 45 on the distillate reservoir 43. Each of these level controls 45, 48 may operate substantially independent of the rest of the system 10. However, in certain embodiments, the level controls 45, 48 may operate directly to control the feed 35*a* through the lines 33*a*, in order to match mass flow rates according to conservation of mass.

An ancillary option at an appropriate place in the system 10 may be a distillation column 49. It has been found useful in some production water sources to implement a distillation column 49 in order to remove heavier materials, such as distilled water, in a stripping section, while separating out lighter components, such as methanol or the like, in a rectifying section at the top thereof. Thus, the distillation column 49 is an optional element that may or may not be included depending upon the particular site being serviced by a system 10.

A compressor 50 compresses vapor 27 originating in the tank 30 in the brine 23, and collecting above the brine 23. The compressor 50 is responsible to raise the pressure in the vapor 27 according to the Clausius-Clapeyron equation relating temperature rise to pressure rise. Accordingly, the vapor 27 passes through the compressor 50 and is fed back into the manifold 19 of the core 20.

The pressure downstream of the compressor 50 exists substantially the same in the conduit 18, manifold 19*a*, and the close channel 24. The differential in pressure between the upstream side of the compressor 50 and the downstream side thereof effects a pressure of saturation corresponding to a higher temperature of saturation.

Heat is transferred due to the temperature differential between the closed channels 24, of compressed vapor, and the open channels 22, in the brine 23. Heat from the condensing, saturated vapor 27 in the closed channel 24, transfers into the brine 23.

In some embodiments, a vapor handling system 52 may be mounted near or at the top of the tank 30. In the illustrated embodiment, the vapor handling system 52 may include, for example, a mist eliminator 54. Typically, a mist eliminator 54 is responsible to remove droplets of water, which may entrain droplets of brine 23, from the vapor 27 and bring with them the risk of carrying dissolved solids toward the compressor 50.

Various embodiments of vapor handling systems 52 may be considered. In addition to the mist eliminator 54, for example, a deaerator 56 may be included as part of the vapor handling system 52. De-aerators at this stage need not be excessively large, nor vent substantial quantities of the vapor 27.

For example, in one apparatus and method constructed for experiments, and producing approximately 100 barrels per day of distillate in the distillate tank 42, a de-aerator 56 was sized by conventional chemical engineering principles. Henry's Law, which relates concentrations of non-condensables or other vapors within liquids, according to the partial pressure and a physical constant, as described hereinbelow, required a reservoir of about twenty liters. Accordingly, the deaerator 56 needed only about five liters to be vented approximately once per day during operation.

In general, a plenum 58 above the brine 23 in the tank 30 may be sized to provide a dwell time or accumulation time for vapors 27 in order to enhance mist elimination.

Numerous manufactures produce compressors of constant displacement, positive displacement, and so forth. For example, Ingersoll Rand, Dresser, and other companies produce compressors 50 suitable for application in a system 10 in accordance with the invention. Likewise, a plenum 58 may be sized according to the rating of a compressor 50.

Ultimately, the brine 23 is concentrated by boiling and vaporizing the brine 23 into vapor 27. As vapor 27 leaves the brine 23 as bubbles, and enters the plenum 58, the residual dissolved solids within the brine 23 increase in the region about the vaporized bubble. This increase in dissolved solids in this surrounding brine 23 results in higher density and a net downward flow of this more dense brine 23.

Ultimately, the tank 30 establishes a concentration profile or gradient, in which the brine 23 of lowest concentration exists at the interface between the brine 23 and the vapor 27. Accordingly, the heaviest or the most concentrated brine 23 is established at the output level of the tank 30. The function of the system 10 is to concentrate brine 23 from whatever concentration exists in the feed tank 32 to a much greater concentration.

As the brine 23 loses water into vapor 27 collected in the plenum 58, localized concentrating processes occur around every bubble formed. These localized concentrations, result in localized descent of heavier brine 23 relative to lighter brine.

For example, the brine 23 in the feed tank 32 has less dissolved solids, and is lighter, per cubic inch or cubic centimeter than the brine in the brine tank 38. In the locality of bubbles, a density differential develops beside a bubble that has vaporized. The bubble leaves behind its share of dissolved solids to be absorbed by neighboring liquid water molecules in the brine 23. Ultimately, with the continuing process of heating and evaporation occurring within the open channels 22 as a result of the heat transferred from the closed channels 24, a continuing concentrating process occurs within each open channel 22.

As a direct result, heavier, more concentrated brine 23 moves downward seeking density equilibrium among equally agitated boiling or near boiling neighbors. Thus, in steady state the maximum concentration of dissolved solids exists at the outlet of the tank 30 and the minimum density and minimum concentration of dissolved solids exists at the interface between the brine 23 and plenum 27. This has been demonstrated in experiments.

A concentrate handling system 60 is responsible for handling the concentrated brine 23 exiting the tank 30. In the illustrated embodiment, the concentrate handling system 60 includes a slurry handling system 62. The slurry handling system 62 is responsible for handling such items as high density precipitates that may form sludge, or other suspended solids at high concentrations in liquid. Accordingly, such materials may be separated from the brine 23 of the tank 30 and directed to disposition different from the brine in the brine tank 38.

Similarly, a reservoir 64 may act as a settling tank 64, as well as concentrator 64. As a practical matter, concentrations, having or causing the greatest stratification, occur in regions where concentrating activity, such as boiling evaporation are found. In the illustrated embodiment, that region is the region within the open channels 22. In contrast, the reservoir 64, lacking any heating or evaporation mechanism concentrate may operate as a settling region, and typically does not concentrate substantially further.

Likewise, the brine concentration system 60 may include a variety of mechanisms within the slurry handling system 62 to assist in removing precipitates and other solids from the walls, floors, and the like of various components.

Solids removal equipment is known in the art and may include vibration systems, scraping systems, augers, combinations thereof, and the like. Ultimately, a slurry holding system 66 may actually be separated by valving from the slurry handling system 62, and only receive brief and periodic discharges of solidus flows into the slurry holding system 66. Such systems may be manual, automatic.

Following passage through the pre-treatment system 34, the brine 23 may pass through a flow divider 74, such as a valve or system of valves dividing the overall flow in the lines 33 from the feed tank 32 into F1 and F2, illustrated by feed 35a passing through line 33a. The flow divider 74 is responsible for maintaining a constant flow to the distillate heat recovery system 47, and a variable flow to the brine heat exchanger 36. The control of the relative proportion of these flows will be discussed hereinbelow.

In the illustrated embodiment, the flow 35a through the lines 33a represents two flows. A fixed rate through the distillate heat exchanger 44 is matched to the fixed flow of the distillate through the distillate heat exchanger 44.

In contrast, the fresh brine from the feed tank 32 passing through the brine heat exchanger 36 is adjustable, commensurate with the flow of brine concentrate out of the tank 30, through the line 33c into the brine heat exchanger 36. In all cases, metered pumps, controlled typically by being fixed displacement pumps 76, may be placed in the lines 33 to control the rates of the flows 35 into and out of the tank 30. For example, feed pump 76a may control the flow of brine from the feed tank 32 through the distillate heat exchanger 44.

Likewise the pump 76b controls F2, or the flow 35a passing from the brine heat exchanger 36 into the diffuser 68 in the tank 30. Similarly, a brine pump 76d may control the feed of the concentrated brine from the tank 30 through the brine heat exchanger 36. A pump 76c may control the flow of distillate into the distillate heat exchanger 44, and may be matched by mass flow of the brine pump 76a.

Continuing to refer to FIG. 1, while referring generally to FIGS. 1-12, a system 10 in accordance with the invention typically feeds preheated brine 23 through the lines 33a into a diffuser 68. The diffuser 68 is described in various options in FIG. 3. By whichever mechanism is selected, the diffuser 68 has the effect of distributing the brine 33a, in a fashion that will allow the brine 23 from the lines 33a to distribute across the maximum extent of the core 20.

For example, the cross-sectional area or foot print of the core 20 in the tank 30 represents a particular area of interest. That area presents the bottom openings of all the open channels 22. Accordingly, a diffuser 68 may be responsible to distribute the flows 35a of the lines 33a within the core 20. If all the flow 35a passes into a single open channel 22, the efficiency of the core 27 will be different from that achieved if all open channels 22 of core 20 have a reasonably equal opportunity to receive a portion of the flow 35a.

An auxiliary heater 70 is responsible to add heat received from a heat source 46 or an auxiliary heat source 46. In the illustrated embodiment, the auxiliary heater 70 is positioned below the bottom of the core 20.

In certain embodiments, the auxiliary heater 70 may be placed on a wall 31 of the tank, rather than inside the tank 30. Likewise, the auxiliary heater 70 may be respectively positioned with respect to the diffuser 68, such that auxiliary heat source 46 feeds heat directly into concentrated brine at the bottom of the tank 70, rather than into the incoming brine 35a flowing into the diffuser 68.

In some embodiments, a diffuser 68 may not be required. In others, an engineering selection may be made between heating the incoming brine 35a with the auxiliary heater 70, and allowing the incoming brine flow 35a to simply rise due to saline convection (TDS content convection) to the top of the core 20 without the benefit of carrying any heat.

In FIG. 1, diffuser 68 is positioned at a level below the auxiliary heater 70. Thus, the flow 35a from the input lines 33a emitting from the diffuser pass through the layer of heated brine created by the auxiliary heater 70. This provides a heat transfer mechanism for heating the tank brine 23. In some embodiments, the auxiliary heater may actually be located in the diffuser. In other embodiments, the auxiliary heater 70 may be attached to the inside or outside of a wall 31 of the tank 30. In other embodiments, the auxiliary heater 70 may actually be in the lines 33a feeding into the tank 30.

In order to monitor, and subsequently control operation of, the system 10, sensors 72 may be installed in the system 10. Sensors 72 may include sensors 72 to monitor pressure, temperature, concentration of dissolved solids, combinations thereof, or the like. In the system 10, concentration effectively improve heat transfer, and mass transfer (evaporation and condensation, for example) by virtue of even small differences in concentration. Hence, temperature, pressure, and concentration measures are significant as control parameters in the brine 23 and the vapor 27. Control of system 10 may require a multiplicity of these sensors 72.

Nevertheless, with such items as the compressor 50, lines 33, conduits 18, and other fixtures, pressures may vary throughout the system 10. Meanwhile, inasmuch as the system 10 operates about saturation pressures and temperatures, temperature is an indicator of pressure, and vice versa. Thus, each may be sensed, and steps may be taken to assert active control in accordance with established functional relationships.

Concentration profiles, which may be referred to as gradients, of dissolved solids are established within the brine 23 of the tank 30, and thus localized density may be implied by those concentrations. Accordingly, density changes, altitude changes, together with any pressure changes within the plenum 58, may add up to provide a comparatively wider variety of pressure and saturation temperature variations at points throughout the tank 30 than would a mixed tank 30. Thus, monitors and control systems may be in place to read the sensors 72 and feed that data to actuation devices.

In the illustrated embodiment, sensors 72a are positioned within the open channel 22 exposed to the free stream or bulk of the tank 30. Sensors 72b are located within the closed channel 27. Sensors 72c detect conditions within the tank 30 near the wall 31. The sensors 72c may be placed at the wall, but will more typically be placed in the brine 23 spaced from the wall 31, but mounted to the wall 31. Sensors 72d exist in the plenum 58 to detect conditions therein.

Likewise, sensors 72e in the vapor handling system 52 detect conditions therein, while sensors 72f monitor the heaviest brine 23 concentrated at the bottom of the tank 30. The region hosting the sensors 72f does not have any portion of the core 20 active therein but may be important in the control of system 10.

The compressor 50 may be monitored by sensors 72g on the upstream or inlet side thereof, and sensors 72h on the downstream or outlet side thereof. Ambient conditions may be monitored by sensors 72j external to the tank 30, located in the environment to sense ambient and atmospheric conditions.

From the plenum 58, the conduits 18 carry the vapor 27 into the compressor 50, and from the compressor 50 into the plenum 19a of the closed panels 24 or closed channels 24. The vapor 27 within the closed channel 24 eventually condenses to form the condensate 25 in the bottom of the closed channel 24. Eventually, the lower plenum 19b of the closed channels 24 may be completely filled with liquid.

Nevertheless, it may be possible that some vapor 27 may be circulated through the distillate 25 or the condensate 25 at the bottom of the closed channels 24. Accordingly, the flow from the closed channel 24 into the vapor trap 41 may contain both gas and liquid phases of the condensate 25.

Meanwhile, the level control 45 monitors the level of condensate 25 in the reservoir 43. Ultimately, the reservoir 43, controlled by the pump 76c passes the distillate through the distillate heat exchanger 44 and on to the distillate tank 42.

Figure 2A:
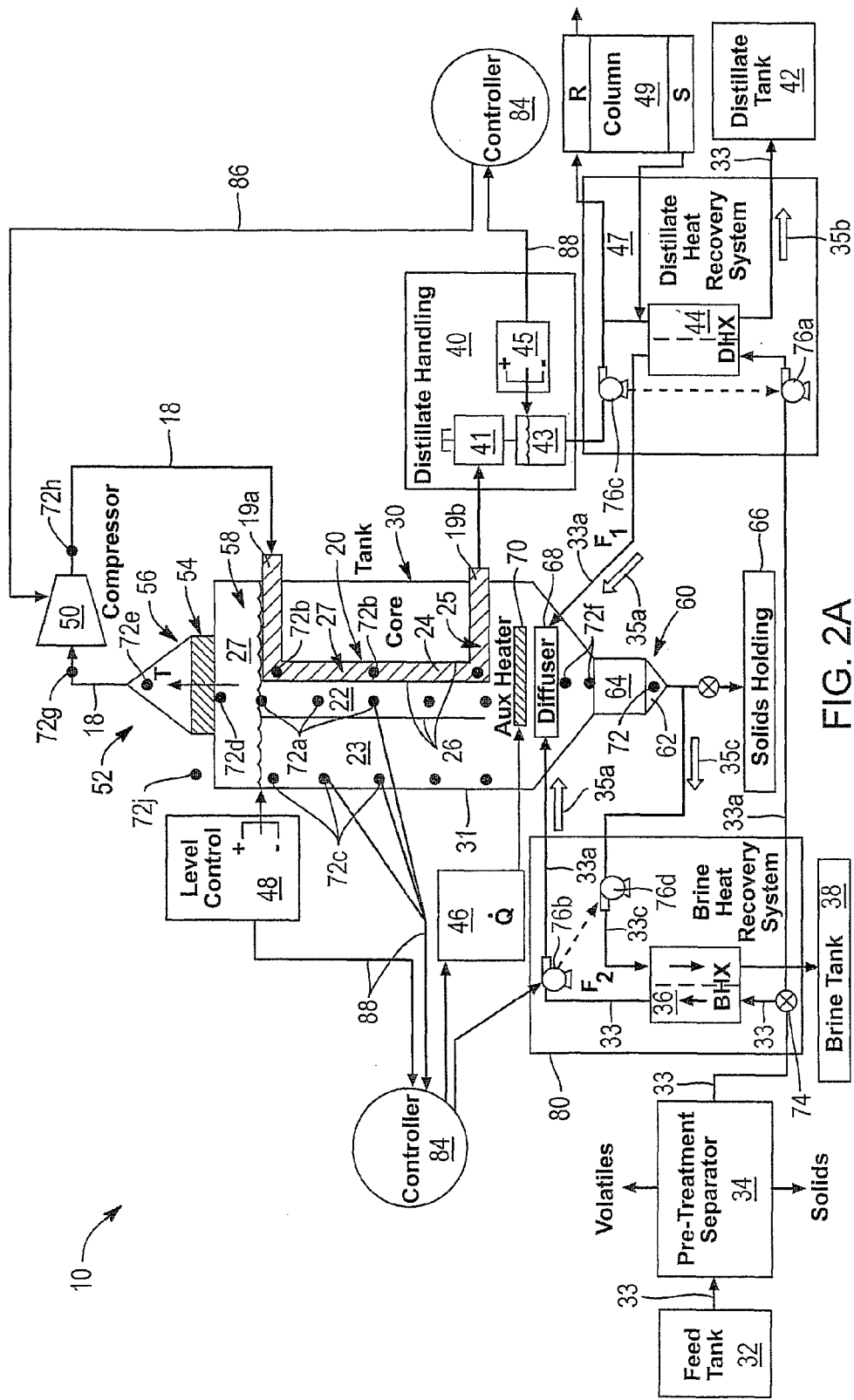
FIG. 2A is a schematic block diagram of the system of FIG. 1 implementing sensors and a controller for operation of key apparatus and parameters.

Referring to FIG. 2A, while continuing to refer generally to FIGS. 1-12, the system 10 may include a controller 84. In general, controller 84 includes at least one processor, and typically the complete input systems, output systems, processing facility, memory, and so forth of a computer. The controller 84 may receive data, process data, store data, and so forth. The controller 84 is responsible to receive inputs from sensors 72 throughout the system 10.

Specifically, the controller 84 will receive information in the form of data regarding temperatures, pressures, concentrations, and so forth as well as flow rates, and the like from the various components described hereinabove with respect to the system 10. In the illustrated embodiment, the controller 84, although illustrated multiple times, may be a single processor-based system, or multiple processors. The controller 84 may be consolidated, distributed, or any other configuration. The controller 84 may be a single controller, multiple controllers, or a system 84 of controller.

Meanwhile, the controller 84 is also responsible to send command singles back to the various pumps 76, and to the auxiliary heat source 46, the auxiliary heater 70, or both. Controller 84 may control the input of heat from the auxiliary heat source 46, as well as the input of power to the compressor 50.

In general, the controller 84 commands 86 or sends outputs 86 as commands 86 to the various devices and components within the system 10, and receives inputs 88 or reads 88 the inputs 88 from those and other components. In the illustrated embodiment, the controller receives inputs likewise from such components as the level control 48, and the level control 45.

However, typically, the level controls 45, 48 operate within themselves to control the level directly, in a manner well understood in the art.

Figure 2B:
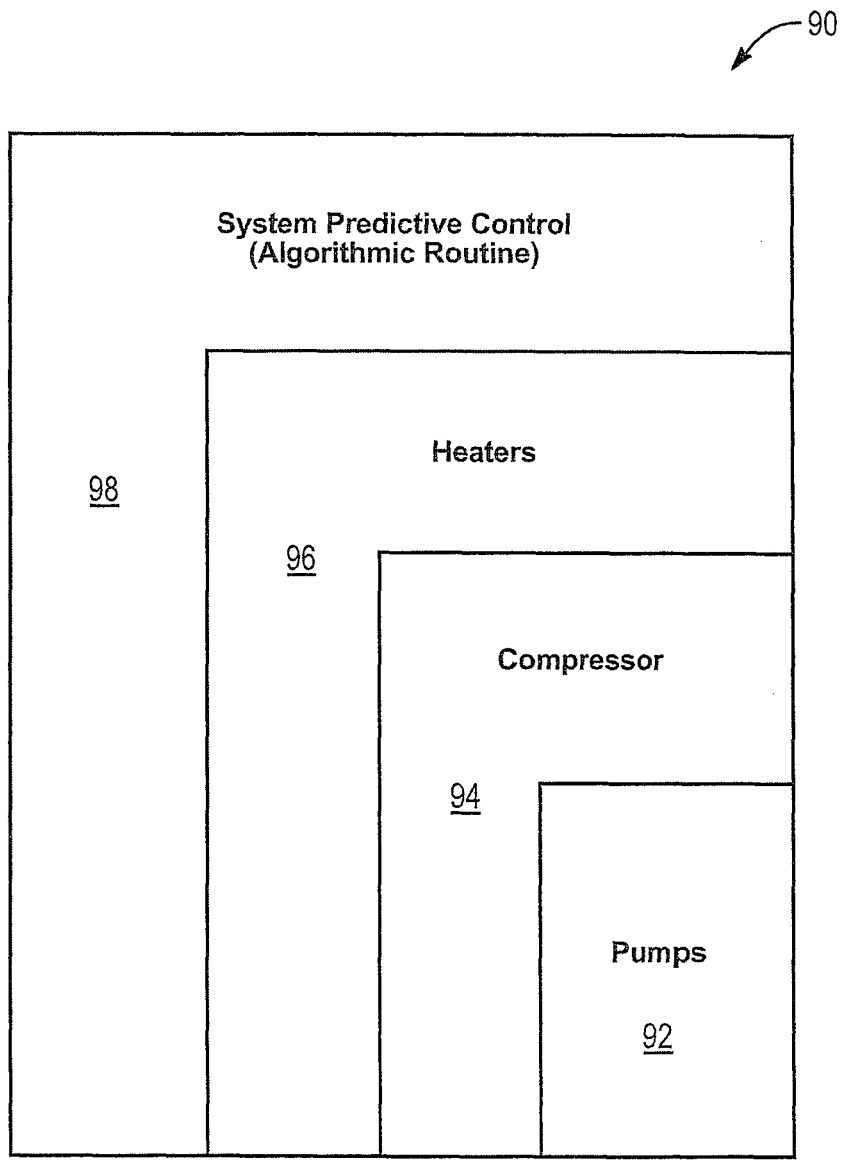
FIG. 2B is a schematic block diagram of the control system, illustrating the inner-most and outer-most levels of control.

Referring to FIG. 2b, a control schema 90 identifies four levels of control. At level zero 92, the control system 90 or control schema 90 operates to control the liquid mass. Thus, the zero level 92 may also be referred to as the liquid mass control 92. Likewise, the first level of control, above zero, is the vapor mass control 94. The liquid mass control could operate completely independent of any other control system but is incorporated as the basic or zero level of control in schema 90.

Likewise, the first level 94 or the vapor mass control level 94 deals with the vapor 27 in the plenum 58, through the compressor 50, and into the closed channels 24 of the core 20. These depend on a formula relating the work done by the compressor 50 to the pressure and temperature within the vapor 27 passing through the compressor 50. Thus, while the level zero system need only track and control a value of a liquid level, the vapor mass control 94 has a more sophisticated responsibility. It must track the liquid levels in the liquid level controllers 45, 48, and also operate the compressor 50 in response thereto in order to assert control over the principle energy input to system 10, the worth of the compressor 50.

The second level control 96 or the energy control 96 is responsible for controlling a rate of change of energy inputs into the system, such as heat into the auxiliary heater 70. Accordingly, the energy control 96 must operate on the basis of a formula, algorithm, computer program, from the conditions of temperature, pressure, concentration, and the like within the tank 30 and other components of the system 10, and assert control over the regulation of heat through the heater 70 as part of controlling the energy of system 10.

Significant in operation of the energy control is the fact that the time of response of the tank 30 is measured in hours, sometimes many hours. By contrast, the pressures reported by the sensors 72g, 72h in the plenum may facilitate a compressor response in seconds. Thus, the compressor 50 may be adjusted in current draw, and thus speed or velocity. Therefore, volumetric flow rate can be adjusted almost instantaneously. By contrast, the addition of energy by the energy control system 96 will not be evident for a much longer period of time.

In contrast, a liquid level may be observed by sight in a manometer or gauge. However, energy flows cannot be observed physically, typically, and the rates of change and the relationships within the system 10 are not obvious, nor intuitive.

The third level 98 of control or the system predictive control 98 is strictly algorithmic and computational in its implementation. The sophistication required is high. Many parameters, many sensors, thermodynamic considerations, material properties, and the like all go into an algorithmic determination by the system predictive control 98 of where system 10 is operating and where it should be.

For example, the system predictive control system 98 is responsible to review all data in the controller 84, from all sources, including the history of operation of the system 10. The system predictive control 98 may interpolate, extrapolate, or use other numerical method solutions to solve complex equations involving partial differentials of any value, rate of change, or the rate of change of the rate of change of variables, in order to precisely and adequately predict control set points. It may control assert control over the heater 70, the compressor 50, level controls 45, 48, pumps, and other volumetric flows.

The system 10 is sufficiently robust, even resilient, that it can accommodate wide variations in inputs. For example, brine concentration rates of from approximately 10,000 parts per million of total dissolved solids up to greater than 150,000 parts per million of total dissolved solids may be provided as inputs into the system 10. Likewise, substantially any output concentration, from such values to above 200,000 parts per million may be accommodated.

This predictive control system 98 may provide a substantial advantage to the system 10 by calculating the optimum set points for control parameters sent by way of commands 86 to the components. The system 10 may thus obtain optimum energy efficiency, brine 23 throughput to distillate 25, and so forth.

Figure 2C:
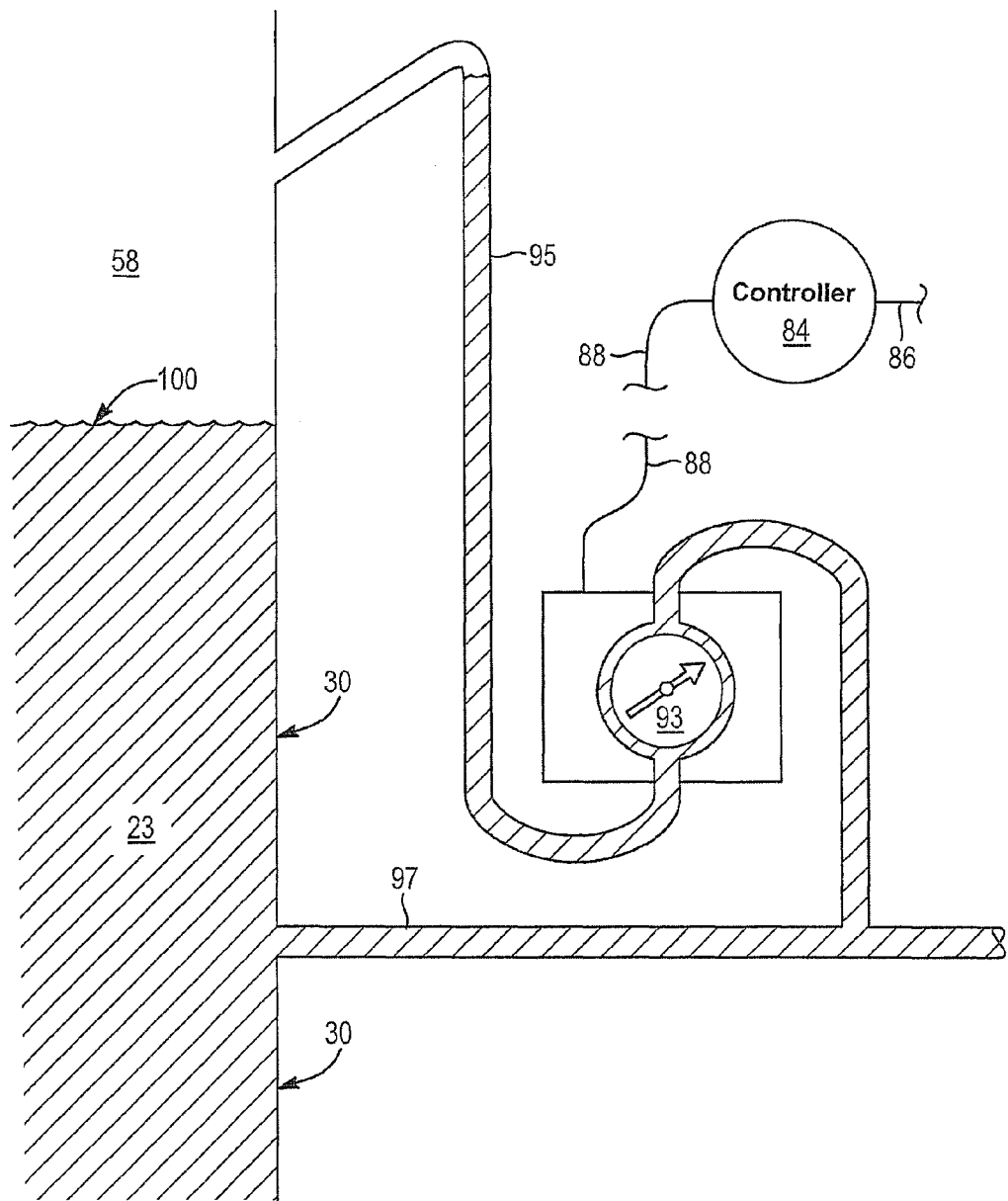
FIG. 2C is a schematic diagram of a mechanism for detecting liquid level in a tank in accordance with the invention, without interference from turbulent surface activity.

Referring to FIG. 2c, a common problem in boiling regimes such as the vapor-liquid interface 100 of tank 30 between brine 23 and vapor 27 is the variable nature of the fluid level. The configuration of a meter 93 overcomes this problem. This may be important for the control schema 90.

In one embodiment of a system 10, the plenum 58 may provide a pressure source to a meter 93. The meter 93 may detect a pressure differential, and thereby provide processing by the controller 84 or by imbedded processing, the liquid level 100 in the tank 30. Similarly, such a meter 93 may be embedded or attached as a liquid level control 45 or 48.

In the illustrated embodiment, a line 95 from the vapor region, in this instance the plenum 58, will fill with vapor 27, which will condense and fill the line 95. Meanwhile, the brine 23 within the tank 30 may feed through the line 97. The two lines 95, 97 thus feed opposite sides of a gauge 93 such as manometer, of any configuration. This may be a manometer, gauge, meter, or the like. Likewise, the line 97 may serve as a common reference to other gauges 93 elsewhere in the system.

Figure 3:
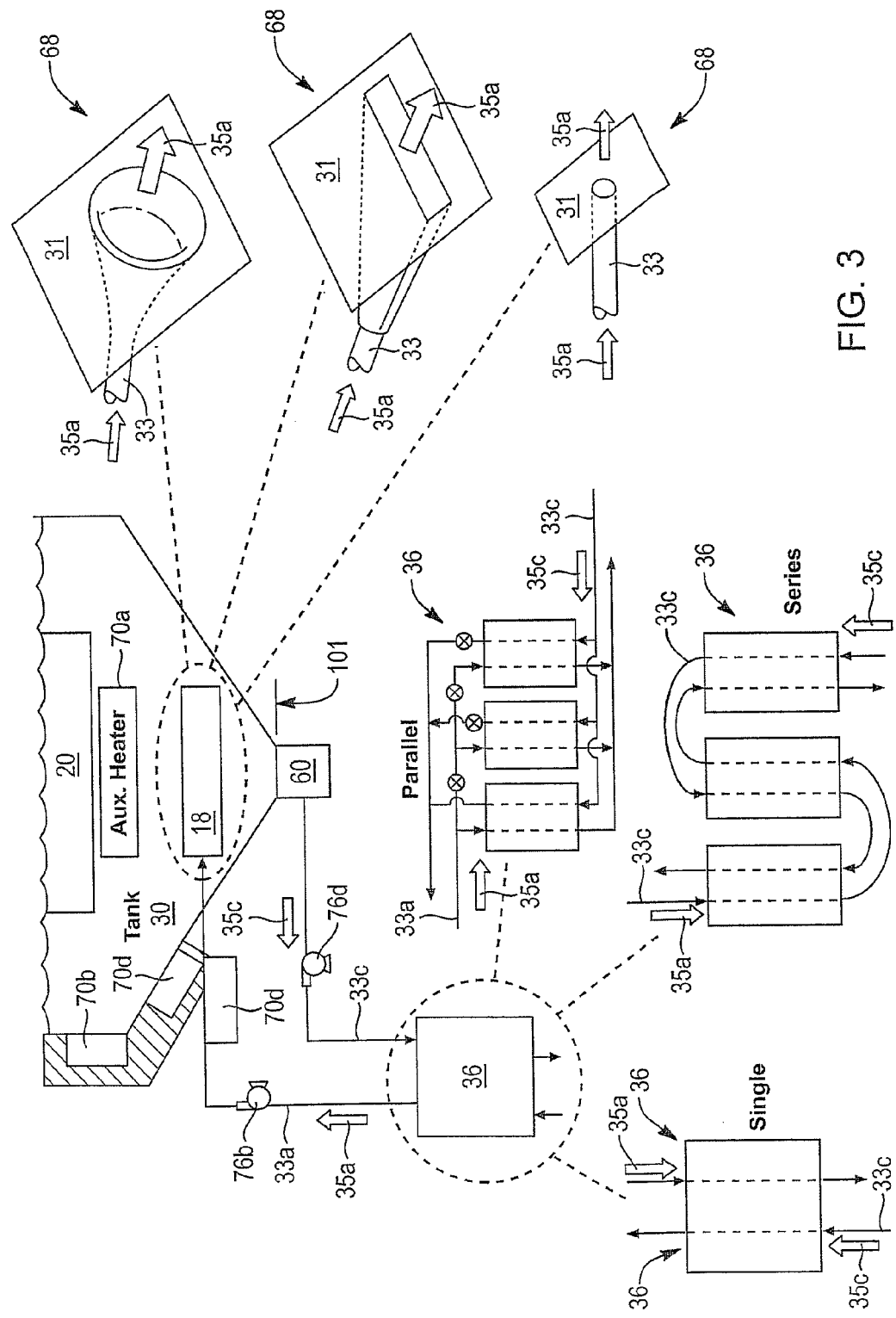
FIG. 3 is a schematic diagram of various embodiments of option configurations of components for the system of FIGS. 1-2.

Referring to FIG. 3, in one embodiment of an apparatus 10 in accordance with the invention, a tank 30 may receive input flows 35a into a diffuser 68. Those input flows 35a are received from the feed tank 32, and may pass through a pre-treatment system 34. In one presently preferred embodiment, the brine flow 35a passing through the brine heat exchanger 36 receives heat from the brine 23 exiting the tank 30 through the line 33c, as controlled and driven by the pump 76d. In such an embodiment, the heat exchanger 36 may be set up in any one of several alternative configurations.

In one embodiment, the heat exchanger 36 may be configured as a single heat exchanger in which the flow 35a of incoming brine is counter flowing contrary to the direction of the exit brine flow 35c flowing in line 33c from the bottom of the tank 30. In such a configuration, the dwell time, heat transfer coefficient, available surface area, and the like may all be fixed, to the extent that the heat exchanger 36 may not be reconfigured.

However, in most presently contemplated embodiments, the flow rate 35a and its corresponding flow rate 35c may be used as control variables. As in FIG. 2B, the control of energy typically includes the control of heat addition to incoming brine 23 preheated by the heat exchanger 36. Meanwhile, the zero level 94 from FIG. 2B includes the level control. One of those level controllers 48 controls the liquid level 100 of the brine 23 in the tank 30. Accordingly, the flow 35a into the tank 30 may be used, as a control variable.

As explained, the flow rate 35a through the distillate heat exchanger 44 with the corresponding output flow of distillate 25 through the distillate heat exchanger 44 may be fixed and matched to one another. The mass flow rate for adjusting the level of brine 23 in the tank 30 may be that control by the level control 48, altering the flow rate of the F2 through the pump 76b and the heat exchanger 36.

Thus, in conditions wherein the incoming flow 35a through the brine heat exchanger 36 is comparatively low F2 may reduce to less than one third of the flow through the distillate heat exchanger 44. In such an embodiment, relatively little heat exchange surface area is required. Thus, reduction to a single heat exchanger 36 may be appropriate.

Circumstances wherein the brine heat exchanger 36 receives a greater proportion of flow in F2 than the distillate heat exchanger 44 receives from F1, the brine heat exchanger 36 may instead carry two or more times the volumetric flow rate of the incoming flow 35a compared to that of the heat exchanger 44 with its controlling pump 76a.

Thus, it may be advisable to provide longer dwell times, greater surface area, or both during conditions when a greater flow rate (comparatively) passes through the brine heat exchanger 36, than the distillate heat exchanger 44. Likewise, as flows change, the number of heat exchangers, the area available, the dwell time, or some combination thereof may be varied.

Referring again to FIG. 3, multiple heat exchangers 36 may be configured in either a series or parallel configuration, valving systems may be provided to engage one, two, three, or more heat exchangers 36 in a parallel configuration. In this way, the number of heat exchangers needed may be engaged, without subjecting the flow 35a, or the flow 35c to excessive distance, and therefore additional fluid dynamic drag to be overcome by the power of the pumps 76b, 76d.

In contrast, flows may be slowed, and dwell times increased, while also increasing the available surface area by arranging heat exchanges in a series configuration. In a series configuration, pressure losses may be comparatively larger. Also, valving cannot be used to direct flows between heat exchangers 36, as all flows pass through all heat exchangers 36.

Depending upon the range of operational parameters to which a system 10 may be subjected, a single, multiple, series, or parallel arrangement of heat exchangers 36 may be configured in the lines 33a, 33c in order to accommodate heat transfer between the flows 35a, 35c.

By way of reference, in one embodiment of an apparatus and method in accordance with the invention a six fold variation in flow rate through the brine heat exchanger 36 necessarily changed the flow speed and, the flow profile. As such flows may be partially laminar and partially turbulent. As will be appreciated by those skilled in the art, such variations affect the net dwell time during which heat transfer can take place, the log mean temperature difference existing between the flows 35a, 35c in the heat exchanger 36, and so forth.

Therefore, the distillate heat exchanger 44 may be designed for the flow rate output for which a system will be operated continuously. In contrast, the brine heat exchanger 36 must be tasked with the control process responsibility of matching the net flow through the system according to the brine concentration ratio of incoming to outgoing brine 23.

Continuing to refer to FIG. 3, specifically, while referring generally to FIGS. 1-12, a diffuser 68 in an apparatus 10 in accordance with the invention may be responsible to introduce the flow 35a into the tank 30. It has been found that several configurations may be considered, each with a somewhat different effect.

Inasmuch as the tank 30 establishes a gradient of concentration from the lowest concentration of total dissolved solids at the top of the liquid level in the tank 30 to a highest concentration of dissolved solids at the bottom of the tank 30. Two mechanisms tend to operate to exchange heat and mass between the incoming flow 35a and the brine 23 in the tank 30 itself.

By virtue of initial velocity of introduction of the flow 35a into the tank 30, momentum transfers between the incoming flow 35a and the substantially quiescent brine 23 in the tank 30. Thus, mass may be exchanged between the jet and its consequent plume and the brine 23 in the tank 30. Momentum transfer occurs as the jet interacts with the surrounding brine 23, thus mixing, broadening, and increasing the concentration in the jet, as it mixes with the brine 23 in the tank 30.

Likewise, another mechanism, entirely different therefrom in its motivating force and energy, is the brine density plume. A buoyance difference between the more dense brine 23 in the tank 30 and the less dense introductory brine flow 35a from the feed tank 32 results in a buoyant force on the incoming brine flow 35a. Accordingly, the brine flow 35a tends to rise as a lighter fluid 35a within the heavier brine 23 of the quiescent tank 30. This rise also results in a velocity upward by the incoming brine flow 35a, resulting in a plume with aspects of the jet-like behavior. For example, the rising, lighter flow 35a rises through the heavier quiescent brine 23 in the tank 30, mixing therewith, broadening the plume, entraining surrounding brine 23, and resulting in an exchange of momentum as well as content (dissolved solids).

A function of a diffuser 68 is to reduce the effect of a velocity-based momentum jet from the incoming velocity of the flow 35a. Nevertheless, in certain embodiments, the diffuser 68 may simply be replaced by a jet.

In FIG. 3, the line 33 may connect to a diffuser 68 in which the line and the diffuser 68 are both circular in cross section. For example, the diffuser illustrated in the top embodiment illustrates an expansion of the diameter from the diameter of the line 33 as a bell, such as a bell on the trumpet.

Thus, the effective cross sectional area is gradually increased, resulting in a commensurate decrease in the velocity of the flow 35a introduced by the diffuser 68. In the illustrated embodiment, the wall 31 is penetrated for installation of the diffuser 68. Thus, the diffuser 68 introduces the flow 35a through the wall 31.

In the schematic diagram of FIG. 1, the diffuser 68 is illustrated below the core 20. Each potential location has benefits.

The diffuser 68 presents no horizontal surfaces. It provides, in fact, no accessible surfaces on which descending materials from the concentrated brine 23 of the tank 30 may accumulate.

The middle embodiment of the diffuser 68 illustrated in FIG. 3 is configured more in a fan-like shape in which the net area of the line 33 is increased in the diffuser 68, but not with a circular cross-section. Here, the thickness and width of the fan-like diffuser 68 may be selected in order to provide a flow velocity for the flow 35a as desired.

In one embodiment, such a diffuser 68 may be oriented to discharge the flow 35a in a vertical direction below the core 20. In another embodiment, the rectangular cross-section of the outlet of the diffuser 68 may be configured to be a square, and may cover a comparatively larger fraction of the area under the core. However, in the illustrated embodiment, the diffuser 68 discharges the flow 35a directly through the wall 31, and does not present any of its structure within the tank 30 itself.

The lower configuration of a diffuser 68 in FIG. 3 may be constructed in any of several arrangements. The illustrated embodiment shows the line 33 ported directly through the wall 31, resulting in a jet flow 35a into the tank 30. Of course, any degree of change in the cross-sectional area from the line 33 to the output of the diffuser 68 may be selected and may be appropriate. Just as the other embodiments may be arranged to pass the flow 35a through the wall 31, or upward into the core 20 directly, from below the core 20, this embodiment may be arranged in any such manner.

In fact, the flow 35a may be directly horizontally vertically, or obliquely with respect to the bottom of the core 20. In some embodiments, the flow 35a may be introduced through a plate with apertures, through a plurality of lines 33, through various diffusers 68, through a bank of diffusers, or the like. Nevertheless, in the illustrated embodiments of FIG. 3, the diffusers 68 remain outside the wall 31. Here they are able to further reduce the components subject to the destructive forces of the concentrated brine chemistry. They also reduce the tendency toward scaling, fouling, accumulation of precipitants, and the like.

Figure 4:
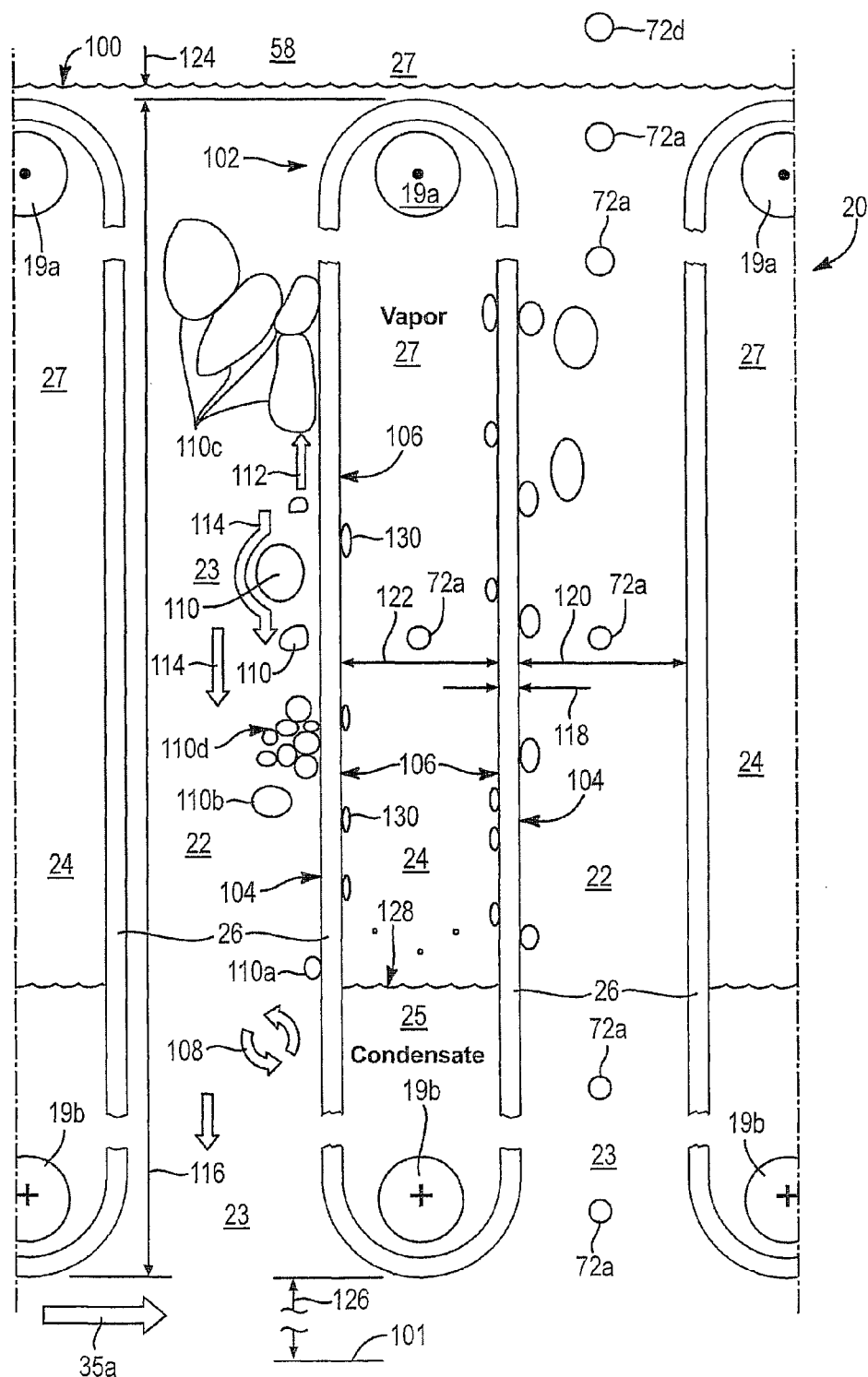
FIG. 4 is a schematic diagram of a core within a tank in accordance with the apparatus and method of FIG. 1, illustrating the activity of the heat and brine convection processes.

Referring to FIG. 4, while continuing to refer generally to FIGS. 1-12, a system 10 in accordance with the invention may include channels 22 open to the surrounding tank from a top liquid level 100 in the tank 30, to a lowest outlet level 101. Meanwhile, each panel 102 around each closed channel 24 forms a mechanical barrier between the vapor 27 and condensate 25 within the closed channel 24, and the brine 23 in open channels 22, which are effectively contents of the tank 30.

Each panel 102 presents an outer surface 104 in contact with the brine 23 in the open channel 22. An inner surface 106 of the wall 26 is in contact with the vapor 27 or condensate 25 in the inner or closed channel 24. Heat is transferred from the high pressure region, having a higher saturation pressure and higher saturation temperature in the closed channel 24. As described with respect to FIG. 1, the compressor 50 compresses the vapor 27 from the plenum 58 to a higher pressure, and corresponding temperature in accordance with the Clausius-Clapeyron equation illustrated in FIG. 7C. The lower pressure and temperature region is represented by the plenum 58 and the open channels 22 in the tank 30.

Thus, heat transferred from the closed channel 24 passes through the wall 26 subject to the heat transfer coefficients on the inner surface 106 and outer surface 104 of the wall 26. Ultimately, convection cells due to thermal convention may occur. Thermal convection is the result of buoyancy, a density decrease by a fluid that has been heated compared to its surrounding and comparatively cooler neighbors.

For example, to the extent that the tank 30 represents brine 23 that has been stratified, stratification in response to brine density differences is several times more significant than the buoyance differential due to a temperature difference. Accordingly, hotter brine 23 may still remain lower, or at a lower level, within the tank, due to the fact that its dissolved solids content prohibits its rising in response to thermal buoyance effects.

Nevertheless, buoyance differentials due to heat addition, rendering the hotter material to be of lower density, and thus lighter, may result in Běnard cells 108 or Běnard convection cells 108. However, these will exist only locally within material having the same density with respect to dissolved solids. The cells 108 tend to move heat from the wall 26 into the bulk of the brine 23 in the open channel 22.

One advantage of a profile (e.g., brine concentration gradient or a density variation with depth) due to dissolved solids concentrations increases with depth within the tank 30 and the open channels 22 is the fact that rather than rising immediately along the wall 26, heated brine 23 may remain localized, thus contributing to increase temperature at a comparatively lower level.

In this way, heat may be transferred continually from the wall 26 into the brine 23 of the open channel 22, even though the temperature differential between the vapor 27 in the closed channel 24 may be nearer to the temperature of the adjacent brine 23 in the open channel 22. Heat transfer still continues because the convection cells 108 did not necessarily become general along the entire height 116 of the panel 102. Rather, energy is "pumped" away from wall 104.

Stated another way, brine 23 at a particular level in the open channel 22 may still continue to pick up heat, and may cause a generation of bubbles 100 at the outer surface 104 of the wall 26, which might otherwise not be able to occur. Compared to the illustrated embodiment and the apparatus in accordance with the invention in free convection, if the tank 30 were full of clean water, heated liquid would always rise in the presence of comparatively cooler liquid. Thus, all the hottest liquid would rise to the top.

In contrast, with stratified brine, hot liquid may exist and remain at the bottom. In fact, a reverse temperature gradient, in which the hottest temperature is at the lower end of the panel 102 is entirely possible, depending on the heat transfer dynamics of the system 10.

In general, bubbles 110 are generated at the outer surface 104 of the wall 26 of the panel 102 anytime localized brine 23 achieves the saturation temperature for its localized pressure. Pressure varies with depth, and density of the brine as well as the overhead pressure within the plenum 58. Thus, lower in the open channel 22, one expects and observes higher pressure.

Moreover, due to the density profile (e.g., gradient) or concentration profile (e.g., gradient), saturation pressures and temperatures rise even further. Nevertheless, inasmuch as the temperature within the closed channel 24 is higher than the temperature in the open channel 22, heat transfer may still occur across wall 26, and bubbles may be generated at the lower extremities of the panels 102.

This phenomenon has been observed in practice during experiments. For example, in free convection with a condensing vapor 27 within a closed channel 24, wherein the outer channel 22 or open channel 22 contained no saline gradient, the formation of bubbles 100 occurred only within the top 5 percent of the height 116 of the panel. In contrast, bubble formation was observed within the bottom 20 percent of the open channel 22, when the open channel 22 contained stratified brine 23.

As each bubble 100 is formed, it would typically nucleate at a site on the outer surface 104 of the wall 26 of the panel 102. However, it will quickly separate as it grows, and move from a position illustrated by the bubble 100a to a position in the free stream of the open channel 22 illustrated by the bubble 100b.

It has been observed that as bubbles 100 grow, due to heat addition, mass addition, and even due to a simple rise in altitude reflecting a reduced surrounding pressure, the bubbles 100 have been observed to strip the boundary layer from the surface 104 of the panel 102. This triggers the generation of clouds of bubbles as illustrated by the bubbles 100d of FIG. 4. These bubbles 100d likewise appear to be able to grow and rise. Nevertheless, they may not necessarily nucleate at the wall 26 but may be generated by an infusion of heat due to the disruption of the thermal and fluid boundary layer as understood in the art of heat transfer.

As the bubbles 100 continue to rise, they tend to grow in size, and tend to coalesce with one another. They begin to form larger bubbles, and tend to move toward the brine 23 in the open channel 22, and away from the wall 26. In fact, as a practical matter as a bubble flow 112 rises, brine is displaced, and a corresponding downward flow 114 of the surrounding brine occurs. A simple mass or volumetric analysis illustrates that as mass rises in the open channel 22, a certain amount of the mass must go down and take its place. This results in a flow 114 around each bubble 100, as illustrated.

As a result of the formation of each bubble 100, vapor 27 leaves the brine 23. Salt, the chemicals listed hereinabove that may be contained in the brine, and the like, may be volatile and nonvolatile. Such contaminants as methanol, may evaporate into the vapor 27. However, salts, dissolved solids, and the like must remain behind and do not evaporate.

Accordingly, the flow 114 around each bubble 100, at the time of formation of the bubble 100, necessarily receives the dissolved solids that cannot vaporize. Experiments on apparatus and methods in accordance with the invention demonstrate a downward flow 114 of heavier brine, resulting in a net gradient having the lowest concentration of dissolved solids at the top surface 100 of the liquid, or the liquid level 100 and the highest concentration of dissolved solids at the bottom of the tank 30.

In general, the height 116 of the panel 102 may be selected to optimize heat transfer. Likewise, the distance or thickness 118 across the wall 26 may be selected for structural and thermal considerations. Similarly, the width 120 of the open channels 22 may be selected in order that the bubbles 100c coalescing together do not obstruct the channel 22, nor dry the outer surface 104 of the panel 102. Such drying of the surface 104 may result in additional scaling, and has been observed to exacerbate corrosion of the wall 26.

The width 122 or thickness 122 of the closed channel 124 may be selected to optimize heat transfer and permit flow by natural convection, thus limiting or eliminating the need of conventional heat exchange, wherein pump energy is used to drive all flows. By contrast, in the illustrated embodiment, the open channel 22 operates by a saline convection or dissolved solids convection with the brine. This is based on buoyance differentials between various flows and regions of the brine 23. Similarly, the vapor 27 within the closed channel 24 as it condenses on the inner surface 106 of the panel 102 eventually forms a condensate 25 collecting at the bottom thereof and exiting out the plenum 19b for liquids.

It has been found that the height 124 or distance 124 between the top of the panel 102 and the liquid level 100 may be positive. In some embodiments, it has been found that heat transfer rates may be effected by vigorous boiling of bubbles 100c near the top of the panel 102. It has been found most effective in the presently contemplated embodiments, as demonstrated by experiments, to maintain the liquid level 100 above the top of the panel 102.

The core 20 will typically be spaced a distance 126 from the outlet level 102 of the tank 30. Typically, a significant volume in the plenum 58 above the liquid level 100 tends to provide a volume against which the compressor 50 may draw. Similarly, a larger depth 126 between the tank outlet level 101, than herein illustrated schematically is desired.

The height 126 is illustrated by a cut line indicating that any additional distance may be added therein. Though not shown in the illustration, such an addition provides the possibility of increasing of highest density brines 23 from the open channel 22 toward the bottom of outlet level 101 of the tank 30.

Nevertheless, the activity within the tank 30, and specifically when the open channels 22 is a densification or increase in concentration of dissolved solids in the brine 23. It has been found generally that the region, illustrated by the height 116 of activity of the concentrating process, is the region that sees the largest change in density profile. Accordingly, the density within the height 126 of the region below the panels 102 does not show the intensity of the steepness of gradient.

Inasmuch as the plenums 19a, 19b carry differential densities, they are different sizes. In fact, the upper plenum 19a may be thought of as simply a manifold 19a feeding vapor at a comparatively larger specific volume, lower specific density, into the closed channel 24. Similarly, the condensate 25 has a density almost 1,000 times greater than that of the vapor 27, corresponding to a specific volume of about one thousandth of the volume of the vapor 27. Thus, the manifold 19b or plenum 19b receiving condensate 25 from the closed panel 27 need not have the same volumetric capacity as the upper manifold 19a.

In general, droplets 130 form against the inside surface 106 of the wall 26 in the panel 102. Droplets 130 tend to migrate downward and may likewise coalesce into streams or rivulets running into the condensate 25 collected at the bottom of the panel 102, resulting in condensate level 128 accumulating in panel 102. The result of condensing vapor 27 on the inner surface 106 of the wall 26 of the closed channel 24, is a very high heat transfer rate on the order of 20 times greater than the heat transfer rate between liquids across a solid surface.

Thus, for example, the rate of heat transfer into the brine 22 from the outer surface 104 of the wall 26 is lower when merely resulting in heat transfer into the liquid brine 22. In contrast, the heat transfer rate, and thus the heat transfer coefficient upon nucleate boiling with bubble 100 formation is comparatively about 20 times that rate, and corresponds to the condensation heat transfer rate on the inner surface 106 of the wall 26 in the panel 102 enclosing the closed channel 24.

Figure 5:
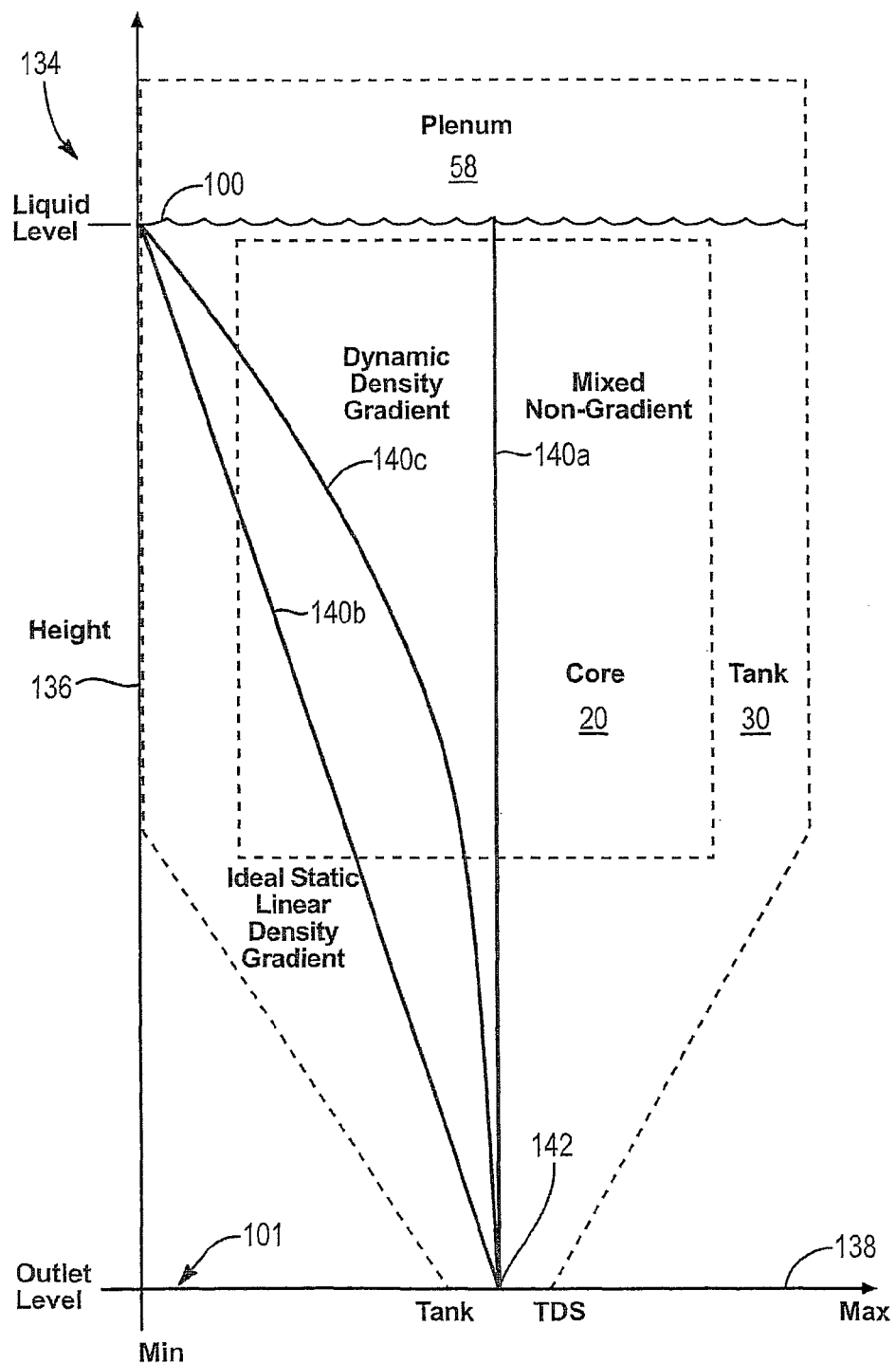
FIG. 5 is a chart illustrating the relationship between total dissolved solids in a tank of the system of FIG. 1, between the liquid level and the outlet level of the tank.

Referring to FIG. 5, a chart 134 illustrates axes 136, 138. The height axis 136 illustrates the height from the outlet level 101 of the tank to above the liquid level 100 including the plenum 58. Meanwhile, the TDS axis or the total dissolved solids axis 138 illustrates the concentration of total dissolved solids within the tank.

The curves 140 are gradients or profiles of concentration or density. In the illustration of FIG. 5, the location of the core 20 is shown in dotted lines, as is the outer shape of a tank 30. The outer level of the tank 30 is illustrated, along with that of the core 20 in order to show the response of the density profile 140 to the altitude or height 136 along the height axis 136.

In the chart 134 of FIG. 5, the curves 140 represent concentrations varying from a minimum amount corresponding to the value on the TDS axis 138 at its minimum value, at its intersection with the vertical axis 136 or height axis 136. Meanwhile, at the liquid level 100, the concentration and therefore the density of brine 23 in a tank 20 is at a minimum value of dissolved solids in an apparatus and method in accordance with the invention.

However, in a mixed environment, one in which the brine 23 in a tank 30 is completely mixed, a profile 140 reduces to a vertical line, having a constant concentration and constant density throughout from the liquid level 100 to the outlet level 101. Thus, the concentration at the liquid level 100 is the same as that at the outlet concentration 142.

In an environment in which a gradient profile may be established ideally, a static linear density profile may be established according to the curve 140b. In this situation, the concentration varies from a minimum value at the liquid level 100 and increases to a maximum outlet concentration 142 at the outlet level 102.

In order to establish the ideal gradient illustrated by the profile 140b, it would be necessary to maintain a continuous, and equal change in concentration at substantially every level between the outlet level 101 and the liquid level 100. This would require tremendous control, though it would also provide a predictable and useful and consistent gradient in the tank 30.

Experimental results in an actual apparatus 10 in accordance with the invention is illustrated in the dynamic density gradient profile 140c. In this profile 140c is seen the change in the density gradient within the core region, as compared with the change indicated in the region below the core. Between the liquid level, the bottom of the core 20, and the outlet level 101, the normalized concentration difference, from the lowest concentration level at the liquid level continually increases to the outlet level 101.

Accordingly, the outlet concentration level 142 of both profiles 140b and 140c originate and terminate at equivalent points. In contrast, however, the density gradient curve 140c is shown to stabilize in a different shape, in which most of the concentration increase occurs within the altitude of the core 20, and very little change occurs therebelow. Thus, the region of the tank 30 below the core 20 may still maintain a gradient.

However, in these experiments not nearly so substantial a total difference as that achieved within the core 20 was observed. This is seen as indicating several facts, including the fact that the core 20 is the region in which the open channels 22 are concentrating brine 23 by evaporating off vapor 27. Below the core, where no substantial vaporizing occurs, the difference in concentration is substantially less.

In reviewing the chart 134 of FIG. 5 in view of the phenomena illustrated in FIG. 4, one may ascertain the degree of mixing occurring within the open channels 22, as opposed to elsewhere in the tank 30. Also, to the extent that the diffuser 68 of FIGS. 1-3 is located below the core 20, brine convection, or the brine density buoyant convection, will occur.

Likewise, for example, brine 23 incoming in the input flow 35a is lighter than any brine 23 within the tank 30. Thus, regardless of the velocity with which the flow 35a is introduced into the tank 30, it will immediately begin to rise through the core 20, or anywhere else within the tank 30 that it is introduced.

Accordingly, the brine buoyance plume created by the inlet brine flow 35a will rise toward the liquid level 100, exchanging momentum, mass density, and heat with the surrounding brine 23 through which it passes. The dynamic density gradient profile 140c therefore illustrates that the actual value of concentration or density within the tank 30 is neither the ideal static linear density profile 140b, nor is it the mixed non-gradient 140a.

Thus, the dynamic density profile 140c (gradient 140c) is very useful in the control and stabilization of a system 10 in accordance with the invention. Of course, the ideal static linear density gradient 140b would be very useful but difficult to achieve, maintain, or both. However, experiments at this point demonstrate that moving away from the mixed, non-gradient condition illustrated in the curve 140a can be achieved, are easily maintained, and provide very useful results.

Referring to FIG. 6, a chart 145 illustrates curves 146 of an increase in total dissolved solids (TDS) as a function of the feed concentration thereof. The formula 148 illustrates a normalized total dissolved solids increase represented by each of the curves 146. The curve 146a represents the increase in total dissolved solids in the brine 23 in the tank 30 at the comparatively minimum feed concentration of dissolved solids in experiments with the apparatus 10 in accordance with the invention.

In contrast, the curve 146e illustrates the increase in the normalized total dissolved solids content in the brine 23 of the tank 30 at the comparatively highest input concentration of dissolved solids in the experiments. The height axis 136, as in FIG. 5, again measures from the outlet level 101 in the tank 30, or of the tank 30 up to above the liquid level 100.

The liquid level 100 is the maximum height at which a general quantity of liquid brine 23 exists in the tank 30. Accordingly, only the plenum 58, holding vapor 27, exists immediately above the liquid level 100. Thus, the dissolved solids content has a value 150 at the liquid level 100. In the experimental system 10 in accordance with the invention, the lowest concentration of dissolved solids occurs at the liquid level 100. Thus, all values measured along the axis 138 are normalized against that minimum concentration of dissolved solids 150.

The shape of the curves 146 reflects the change in rate of concentration increase with depth toward the outlet level 101. Thus, curves 146b, 146c, 146d reflect intermediate input TDS curves within the family of curves 146. The experimental data is contained in curves 146a, 146e. However, the consistent curvature obtained through multiple experiments illustrates that the concentration profile and gradient within the tank 30 are independent from the output TDS.

For example, the curve 146a corresponds to input feed concentrations of 50,000 parts per million as well as feed concentrations of 100,000 parts per million (ppm). Likewise, the curve 146e represents tank concentrations of 100,000 ppm and 200,000 ppm output brine concentrations. However, the input dissolved solids concentration 146, when closer to the outlet concentration of dissolved solids, appears to have less effect on mixing.

Likewise, the larger the discrepancy between the concentration at the inlet flow 35a compared to the outlet brine flow 35c shows a tendency of the more concentrated brine in a tank 30 to rapidly dampen the effect on concentration by the incoming flow 35a. Thus, as the input TDS increases, the curve 146 moves from the curve 146a toward the curve 146e.

Meanwhile, minimum and maximum output concentrations of dissolved solids both result in the curve 146a. Thus, the normalized TDS increase is independent from the output concentration of total dissolved solids at the outlet concentration 152 at the outlet level 101 in the tank 30.

The curve 146a corresponds to four sets of experimental data. Two experiments involved vapor recompression in an apparatus in accordance with the invention at a 50,000 ppm of brine input into a tank 30. In one pair of experiments, the output brine concentration was near or at 200,000 parts per million, the other 100,000 parts per million. Meanwhile, the curve 146e corresponds to two experiments in which the output TDS concentration was 200,000 parts per million. The input feed rate was 100,000 parts per million in each of those experiments, and the outputs were 180,000 parts per million and 200,000 parts per million, respectively.

Figure 7A:
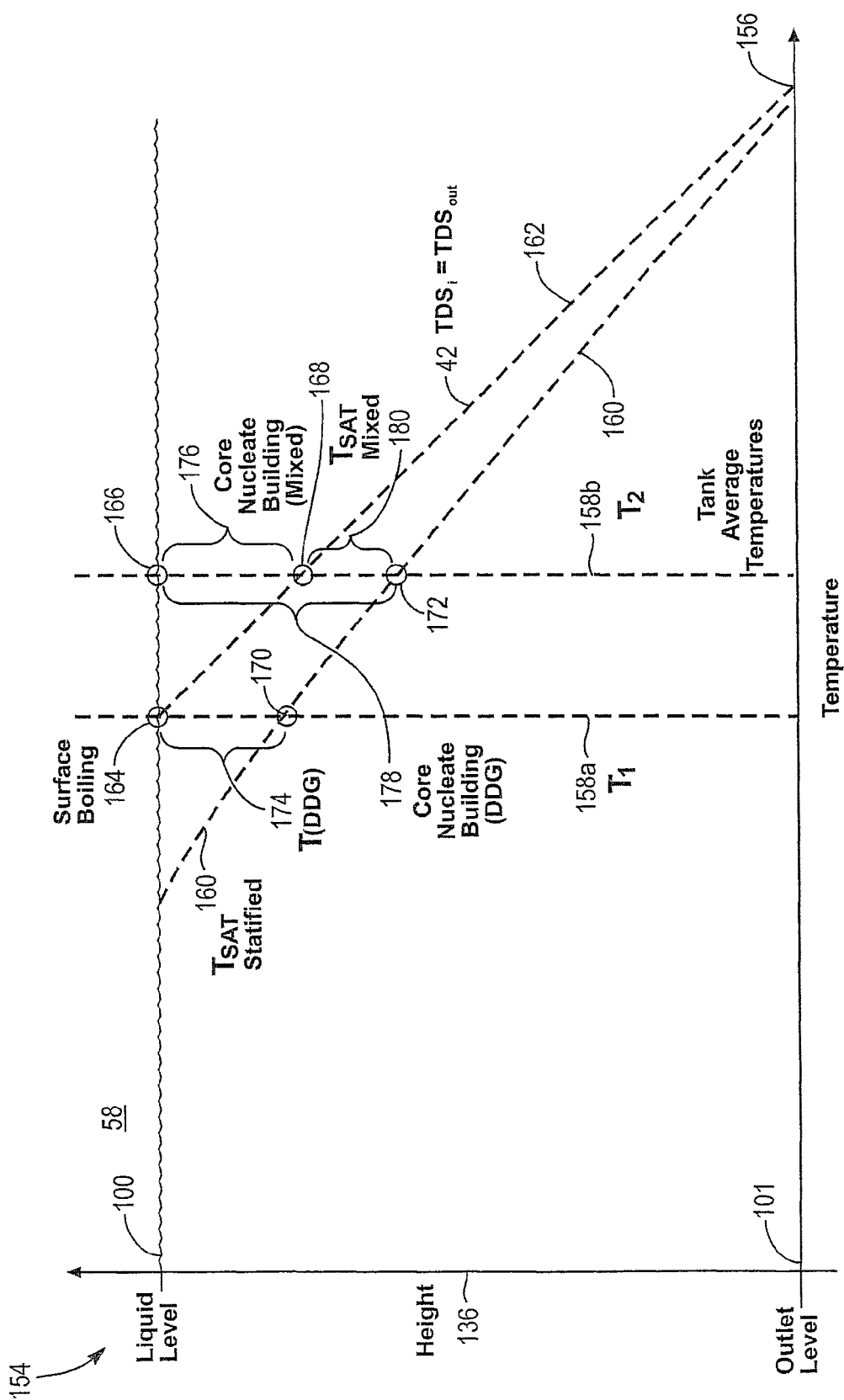
FIG. 7A is a chart of the temperature as a function of height in the tank of FIG. 5, equipped with a core of FIG. 4 in the system of FIG. 1.

Referring to FIG. 7A, a chart 154 illustrates a distribution of temperature measured along the axis 156 against a height measured along the axis 136. In the chart 154, the average tank temperature 158 is illustrated at various positions, including the value of T1 or first temperature identified by the line 158a, and a second temperature or T2 at the line 158b. Here, the curve 160 reflects the saturation temperature in a stratified concentration profile of the tank 30.

The curve 162 illustrates the saturation temperature of a mixed brine 23 in a tank 30. The difference between these curves 160 and 162 reflects the difference in saturation temperature as a function of stratified brine concentration versus completely mixed brine in accordance with Raoult's Law, illustrated in FIG. 182. Both illustrate changes in saturation pressure with depth and density. Therefore, the curves 160, 162 accommodate the depth difference at various locations within the tank 30.

Reference to FIGS. 7A-7E are best understood when viewed together. FIG. 7A is a chart 154 illustrating saturation temperature differences between a saturation temperature in a stratified tank (curve 160), which is not a line, but rather a non-linear curve; the saturation temperature curve 162 describes a completely mixed tank 30. Thus, these two curves 160, 162 correspond to the dynamic density profile curve 140c of FIG. 5 and the mixed non-gradient curve 140a of FIG. 5, respectively.

The difference between the two curves 160, 162 is best understood by reference to Raoult's Law 182 described in FIG. 7B. Here the equation states that the change in saturation temperature within a brine is equal to the product of the ionic constant corresponding to the chemical constituents making up the brine, with the ebullioscopic constant corresponding to the units of degrees celsius times kilograms divided by moles for water.

Similarly, the Clausius-Clapeyron equation 184 describes the rate of change of pressure with temperature according to the dependents on the latent heat of vaporization divided by the temperature and the change in specific volume (volume per unit mass). This equation may be written in several forms including one that indicates the change in pressure is equal to the pressure within the bulk fluid times a power of the natural log. In this last embodiment, the coefficient 'm' is at best isolated as the lower version of the equation 184 in FIG. 7C.

Thus, Raoult's Law governs the change in saturation temperature due to the impurities within a liquid. The Clausius-Clapeyron equation corresponds to the change in pressure as a function of temperature due to compression of a vapor.

FIG. 7D illustrated Dalton's Law 186, sometimes referred to Dalton's Law of Partial Pressures 186. Here, pressure within any volume is equal to the fraction of that volume occupied by any particular vapor, usually an idealized gas, multiplied by the vapor pressure of that gas. Thus, the pressure in the plenum 58 is a combination of the partial pressures of all the evaporated vapors 27 existing therein.

Referring to FIG. 7E Henry's Law 188 describes the relationship between concentration of a solute (dissolved gas) dissolved in a solvent. Accordingly, the concentration of a particularly species designated by the lower case letter 'i' is a function of the partial pressure or vapor pressure of that constituent in a volume divided by the Henry's Law constant.

Thus, Henry's Law 188 describes how much of a supposedly non-condensable gas is actually absorbed. Henry's Law also applies to other condensable gasses.

Therefore, when considering FIG. 7A, the saturation temperature within the tank 30 corresponds to a saturation pressure at any point (depth) within the tank 30. However, the saturation pressure varies with the constituents dissolved in the brine, the volatile ions thereof, and the depth at which one is observing temperature, pressure, and so forth, in accordance with the foregoing equations.

Still referring to FIG. 7A, while continuing to refer generally to FIGS. 1-12, the T1 and T2 average tank temperatures 158a and 158b merely serve as points of reference. The effects of the curves 160, 162 apply at any particular location or depth within the tank 30. Accordingly, the tank temperature 158 is significant to a local effect on the saturation temperature required to boil liquid to vapor 27 in the channel 22. Thus, the significance of the temperatures 158a, 158b is actually their relationship to the localized saturation temperature as given by curves 160 and 162.

Effectively, the curve 162 is a calculated value corresponding to the saturation temperature of the brine 23 in a fully mixed tank 30. Thus, the brine 23 corresponding to the curve 162 is fully mixed and corresponds to the profile 140a as illustrated in FIG. 5 and illustrates the absence of a profile or gradient.

At a tank temperature 158a, the saturation temperature 162 corresponds to boiling liquid level 100 or a boiling surface point 164. Remaining in a mixed condition and descending from the liquid level 100 down toward the outlet level 101, the saturation temperature 162 rises to a maximum of 156. This rise is due to the head level or height of the liquid column above any particular location along the curve 162.

In this example, the surface boiling point 164 is at the surface exactly because there is no submersion below the liquid level 100, so the saturation temperature 162, by the definition of saturation temperature, occurs at the boiling surface 164. In this example, the saturation temperature curve 162 takes into account Raoult's Law 182 and its effect on the boiling temperature 162.

If the tank temperature is raised from the value 158a to a higher temperature 158b, then the same head height is imposed by the liquid level 100. Thus, the new boiling point 166 corresponds to surface boiling into the plenum 58, by the brine at the temperature value 158b. Accordingly, if the temperature profile 162 or temperature curve 162 were shifted to the right, corresponding to the increased temperature 158b, the curve 162 would only go through the point 166 if the saturation pressure in the plenum 58 also rose to the appropriate saturation pressure.

If the saturation pressure in the plenum 58 does not rise, then the region between the liquid level 100 corresponding to point 166, and the height along the axis 136 corresponding to the point 168 will all be boiling. In other words, core nucleate boiling would occur in the upper core region of 176.

Nevertheless, in another example, one may think of the tank 30 being at the average temperature 158b and having the compressor 50 draw down the vapor 27 in the plenum 58. This would result in the drop of the saturation pressure. Accordingly, having the plenum 58 at the saturation pressure corresponding the curve 162, while the average tank temperature is at 158b, the core region 176, between the surface point 166 and the point 168 on the curve 162, boils generally throughout.

The curve 160 represents the saturation temperature existing in the a dynamic density profile or gradient 140c in a tank 30. The curve 160 intersects the tank average temperature 158a at a point 170, a condition wherein the saturation temperature 160 within the tank 30 is exactly at the tank average temperature. Likewise, the point 172 corresponds to the intersection of the saturation temperature curve 160 and the elevated tank average temperature 158b.

These two tank temperatures 158a, 158b are illustrated as constant throughout the altitude of a tank 30 and are used merely by way of example. With a dynamic density profile 140c (see FIG. 5) the stratification within the tank 30 may create any one of a variety of temperature profiles. It is also possible to have a non-constant temperature throughout the height of the tank 30. In other embodiments it may be possible to have reverse gradients in which the hottest temperature is at the bottom of the tank.

Again, anytime the localized saturation temperature 160, or 162 is below a localized temperature 158a, 158b or the like, the brine 23 in the tank at that location will be in boiling mode.

In FIG. 7A, assume that the pressure in the plenum 58 is always at the same, constant value throughout the following discussion. In the chart 154, one may select a temperature 158a within the tank 30.

Now, consider the saturation temperature curve 160 occurring with a gradient in accordance with the invention and represents the dynamic density profile 140c of FIG. 5 due to stratification of the brine 23 in the tank 30. The intersection of this curve 160 intersects the surface 100 not at the point 164, but at some point lower in temperature on axis 156. In accordance with the foregoing discussion, boiling now begins as low as the point 170, where the tank temperature 158a intersects the saturation pressure 160 of the brine gradient 140c.

Given this condition existing at point 170, the entire region 174 above point 170 is in a full boiling condition, with no additional energy introduced. In the configuration represented by the chart 154, the fully mixed saturation temperature 162 is set to boil at the surface 100. In contrast, at the same tank temperature 158a, the stratified brine boils in the entire region above the point 170. Thus, more of the core is involved in high heat transfer nucleate boiling, as compared with that which would have been achieved in a completely mixed system.

Of course, if temperature were raised in order to engage more of the core 20 in boiling, as would correspond to increasing the tank temperature to the value 158b, the point 166 is the temperature value 158b required in the tank.

However, in the stratified condition corresponding to the curve 160, the point 172 reflects the point above which full nucleate boiling occurs throughout the core 20 in the tank 30. Thus, the region 180 represents the additional benefit, or the additional region of the core 20 in which full nucleate boiling is generalized in the core 20 as given by region 178.

Just as the region 174 above the point 170 represents the portion of the core 20 in full nucleate boiling when the tank average temperature corresponds to the value 158a, this increased benefit continues at all points along the curve 160. Regardless of the depth of the region 176 may be, in a fully mixed tank corresponding the saturation temperature curve 162, the stratified saturation temperature curve 160 always provides an improved performance represented by region 174, 180, or by other corresponding differences between the two curves 160, 162.

This benefit may be realized in one of several alternative ways, such as the ability to run the system 10 at a reduced temperature for the same performance. Alternatively, the work done by the compressor 50 may be reduced due to the decreased demands on the saturation pressure in the plenum 58 above the liquid level 100.

Figure 8:
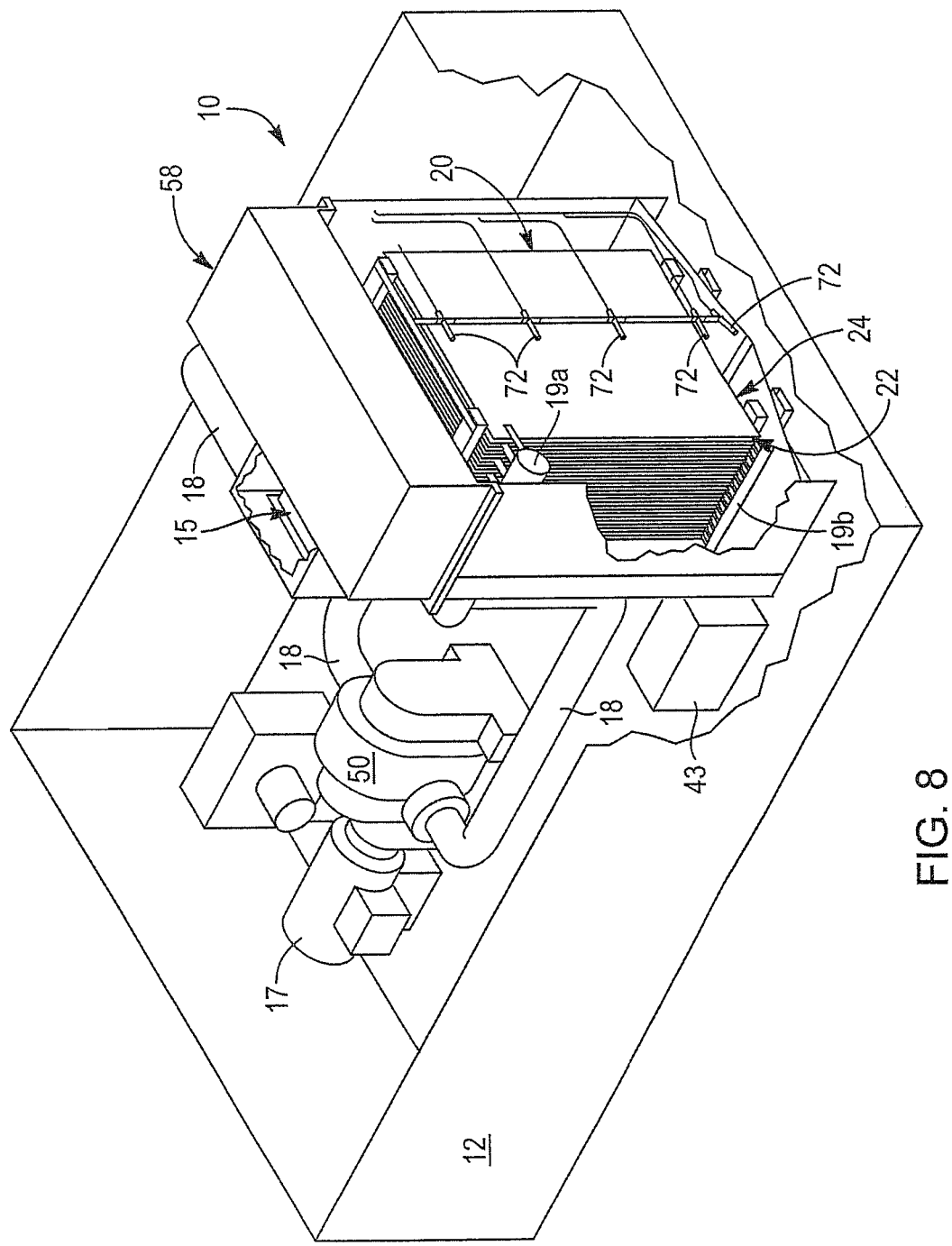
FIG. 8 is a perspective view of one embodiment of an apparatus in accordance with FIGS. 1-7.

Referring to FIG. 8, an experimental system 10 was configured with a housing 12 having a motor generator system. Ultimately, an auxiliary heater relying on line power was also included. The tank 30 was set up with a core 20 placed therein connected to an upper, vapor manifold 19a, and a lower, liquid condensate manifold 19b. The core 20 included open channels 26 in liquid communication with the surrounding region of the tank 30, while the closed channels 24 were sealed away from the tank brine 23.

A plenum 58 above the core 20 accumulated vapors boiling from the open channels 22 of the core 20. A mist eliminator 54 (not seen in FIG. 8) was positioned within the plenum 58. Meanwhile, a heat exchanger 15 was installed, but was not used in the experiments reported in FIGS. 3-7E. The conduits 18 conducted vapor from the plenum 58 to the compressor 50, which then passed those vapors at an increased pressure into the vapor plenum 19a or manifold 19a.

The manifold 19a distributed the vapors 27 into the closed channels 24 of the panels 102 for condensation. Condensate 25 exited the closed channels 24 through the bottom manifold 19b as condensate. Ultimately, after holding in a reservoir 43 the distillate or condensate 25 from the closed channels 24 was eventually passed on to a distillate tank.

Above the core 20, a plenum 58 was arranged, and contained a mist eliminator 54. After passing through the mist eliminator, the vapor 27 in the plenum 58 was passed by a heat exchanger 15 which was not active during the experiments reported in FIGS. 4-7E. Instead, the vapor 27 passed on into the conduit 18 toward the compressor 50. The compressor 50 increased the pressure, and the temperature in the vapor, passing the vapor at this increased temperature and pressure of saturation back into the manifold 19a at the top of the core 20.

The manifold 19a passed the vapors into the closed channels 24 of the panels 102, where it was condensed by discharging the latent heat of vaporization into the surrounding brine 23 in the open channels 22 of the tank 30.

The condensate 25 was then passed from the closed channels 24 into the manifold 19b at the bottom of the core 20, and ultimately discharged through a reservoir 43 into a heat recovery system 47 (as illustrated in FIG. 1) to a distillate tank 42, which are not shown in FIG. 8.

Meanwhile, the system was instrumented with sensors 72 near the central geography of the core 20. Heaters were positioned along the walls 31 of the tank 30. The motor 17 driving the compressor 50 was controlled through a control system that would vary current to the motor 17, thus altering the velocity, throughput, and volumetric flow rate of the compressor 50.

The sensors 72 were placed in the open channel 22 at the center of the core 20. Likewise, sensors 72 were placed along the walls as illustrated, and distributed schematically in FIG. 1. Sensors 72 were configured to detect temperature and concentration within the brine 23 of the tank 20, in the core, and near the wall 31. Other temperatures and pressures were detected in the plenum 58, the conduits 18 on the upstream side and downside stream side of the compressor 50, and so forth. Various experiments were run on the apparatus 10 of FIG. 8 in the development of the data of FIG. 6.

Figure 9:
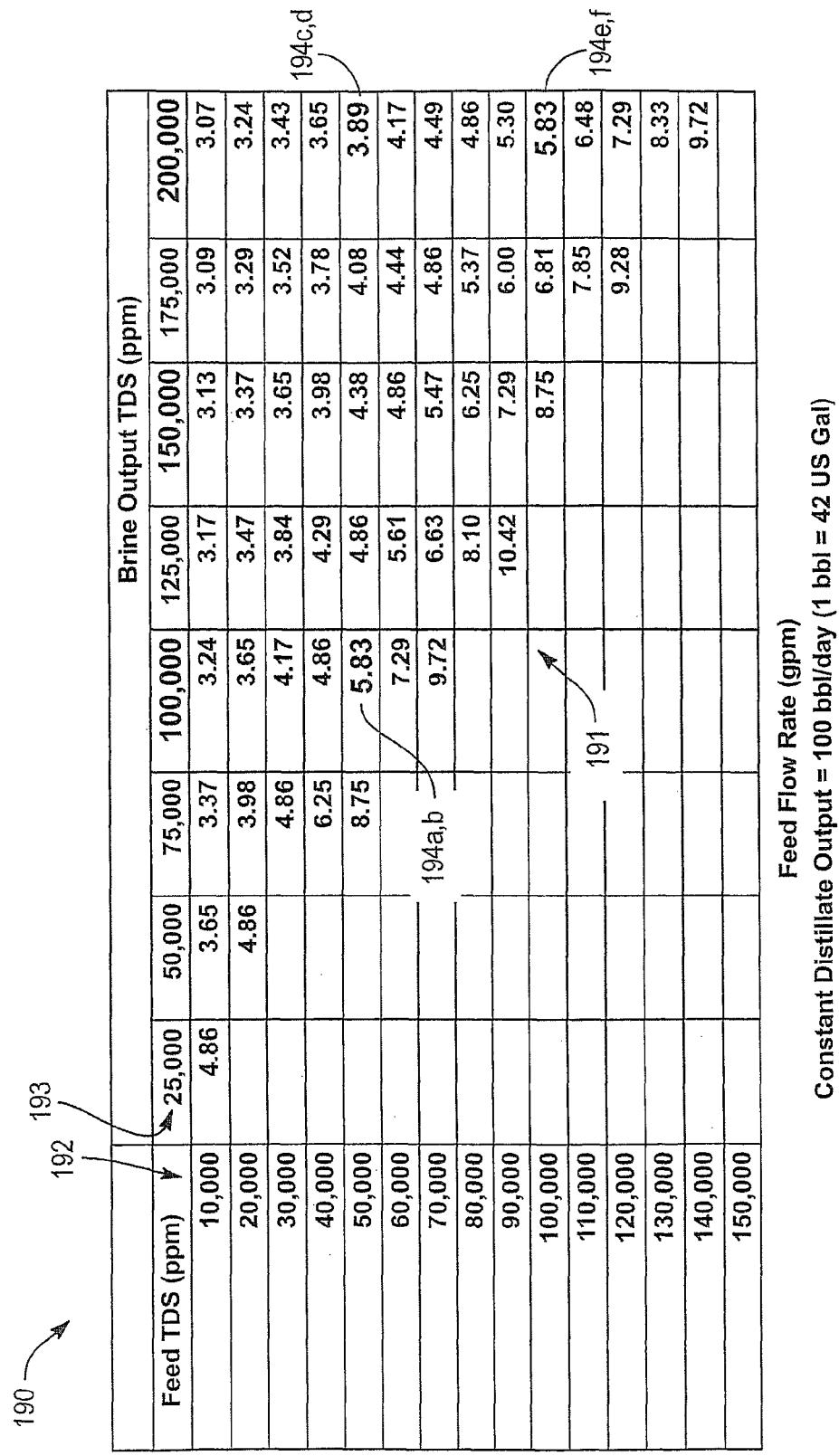
FIG. 9 is a table representing input variables into an experiment in which brine is concentrated from an initial feed water concentration level to an output brine concentration level in an apparatus and method in accordance with the invention.

Referring to FIG. 9, a mass balance reflects the input of the flow rates 35a introduced into the tank 20 and the output flows 35c exiting the brine heat exchanger 36, as well as the quantities of distillate 25 or condensate 25 passed through the distillate heat exchanger 44 to the distillate tank 42.

The experiments contributing to the charts 134, 145 of FIGS. 5 and 6 respectively correspond to the data obtained at the experimental conditions 194a and 194b, the conditions at location 194c and 194d, and the conditions at 194e, 194f. The conditions 194a, 194b correspond to an input feed of 50,000 parts per million. The output corresponds to a brine concentration of 100,000 parts per million in total dissolved solids exiting the tank 30.

Meanwhile, the conditions 194c and 194d correspond to an input brine concentration of 50,000 parts per million and an output concentration of 200,000 parts per million. Likewise, the conditions 194e and 194f correspond to an input concentration of 100,000 parts per million with an output concentration of 180,000 parts per million and 200,000 parts per million, respectively.

Figure 10:
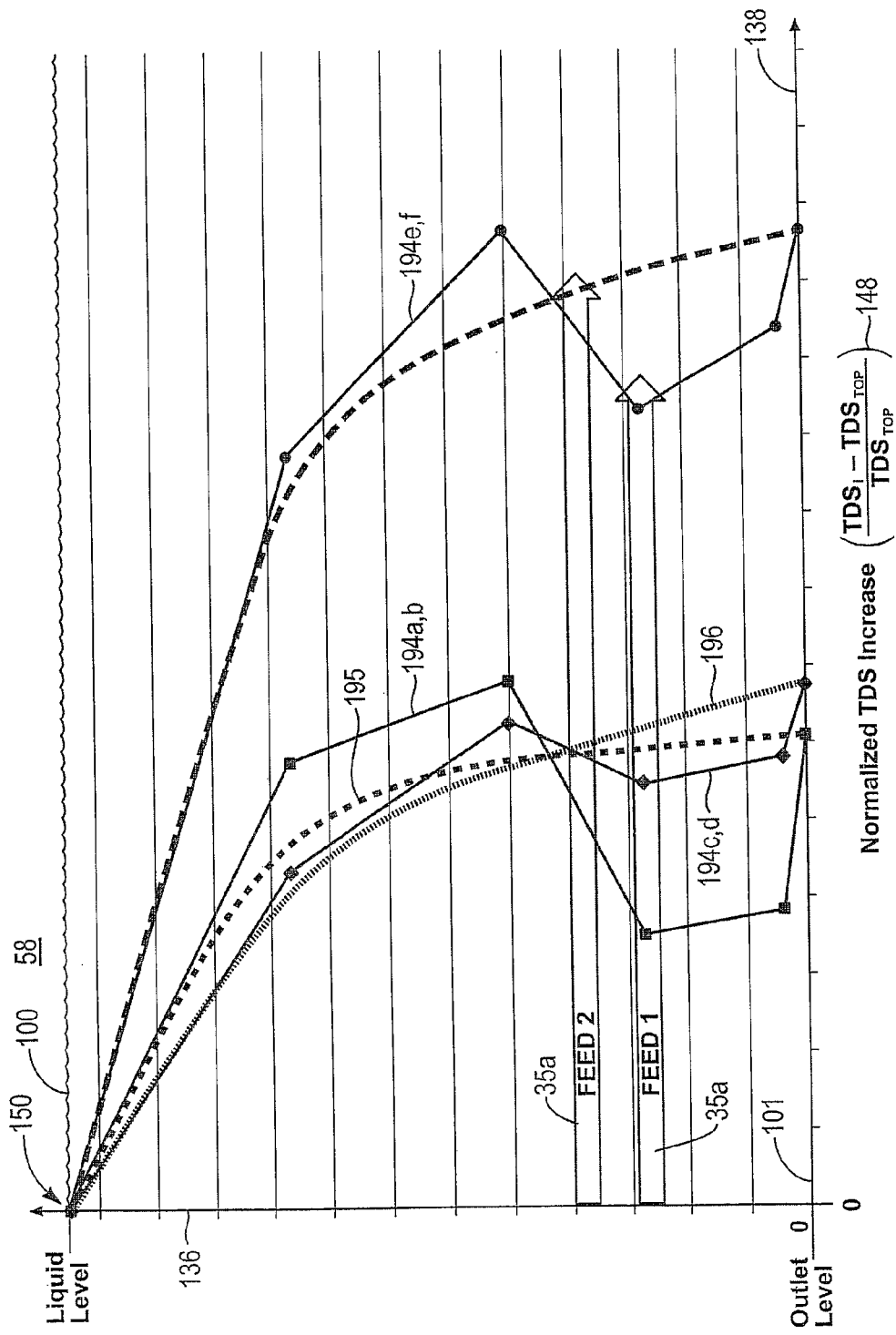
FIG. 10 is a chart illustrating curves representing the concentration or density gradient change in the experiments outlined by FIG. 9 and implemented in the system of FIG. 8, showing the normalized total dissolved solids increase as a function of liquid level in the tank of the system of FIGS. 1-9.

The data conditions of the table 190 of FIG. 9 correspond to a constant output of distillate 25 of 100 barrels (168 liters) per day. Notwithstanding the output brine concentration for the conditions 194e and 194f were not only set at 200,000, the conditions under experiment 194e were set at an output brine concentration of 180,000 parts per million. Referring to FIG. 10, the experiments corresponding to the conditions 194 of FIG. 9 were implemented in the system 10 of FIG. 8. The chart of FIG. 10 plots the normalized increase in total dissolved solids, according to the formula 148 illustrated thereon through the six experiments 194 or the six sets of experimental conditions 194.

The normalized concentration of dissolved solids is illustrated on the TDS axis 138 and plotted against the height from the outlet level 101 up to the liquid level 100 in the tank 30. The region above the liquid line 100 or liquid level 100 corresponds to the location just above the core 20, which was completely immersed in brine 23.

The total dissolved solids value 150 at the top of the brine 23 or the liquid level 100 is normalized, or used as the normalization value, for all the flows. Accordingly, the normalized increase in total dissolved solids is expressed as a fraction above the concentration value at the liquid level 100.

As can be seen from the chart of FIG. 10, the curves 195, 196, 197 reflect the fit of data obtained. The curve 195 corresponds to the fit of data to experiment 194a and experiment 194b. The curve 196 is a fit to the experiment based on the conditions 194c and 194d Likewise, the curve 197 is fit to the data corresponding to the conditions 194e and 194f.

The curves 195, 196, 197 correspond to the curves 186 of FIG. 6. Meanwhile, F135a and F235a are illustrated by their relative height along the height axis 136. One may note that the brine buoyancy plume effect was significant in altering the total dissolved solids within the gradient in the tank 30. Additional information is also available from the raw data charts corresponding to the experiments 194 in FIG. 10.

For example, at the location where the feed flows 35a were introduced into the experimental tank 30, no diffuser 68 was available. Accordingly, the flows 35 were introduced as several pipes each injecting a horizontal jet of the input feed brine 35a from the feed tank 32. Both momentum in the horizontal direction, and the buoyancy forces vertically affected the integration of the input flow 35a into the brine 23 of the tank 30.

Moreover, the experiment conditions 194c and 194d were intended to correspond to an output brine concentration of 200,000 parts per million. In contrast, the conditions 194a, 194b were intended to correspond to an output brine concentration of 100,000 parts per million. The effect of brine concentration in the input flow 35a is significant. Where the brine concentration in the tank 30 was four times that of the incoming brine flow 35a, the tank brine 23 very quickly rectified the concentration of the incoming flow 35a. Above the location of the feeds 35a, the curves 195, 196, 197 match quite closely the raw data.

However, in the vicinity of the incoming flows 35a, the disruptive effect of mixing is seen in the reduction of concentration below the curves 195, 196, 197. This suggests that the system 10 is very robust. For example, the curves 195, 196, 197 are highly dependent on the incoming concentration of the incoming flow 35a and exhibit virtually no dependence on the output concentration.

Thus, the dynamic density profile 140c (see FIG. 5) as detailed by the curves 146 (see FIG. 6) may be relied upon to provide a stable, predictable output condition for the system 10. The heat input, and work into the compressor 50, may be adjusted to accommodate the incoming feed flow 35a to reach the output desire. Significantly, the output result is not in substantial question.

The data of FIG. 10 also substantiate the robust performance and resilience of the gradient in the tank 30 in the face of wide variations in the incoming brine concentration. This is particularly significant in actual production facilities where the incoming brine flow 35a may vary as fracture water, production brine, or the like. These data demonstrate that the output and control of the system 10 need not be subject to such arbitrary inputs.

Figure 11:
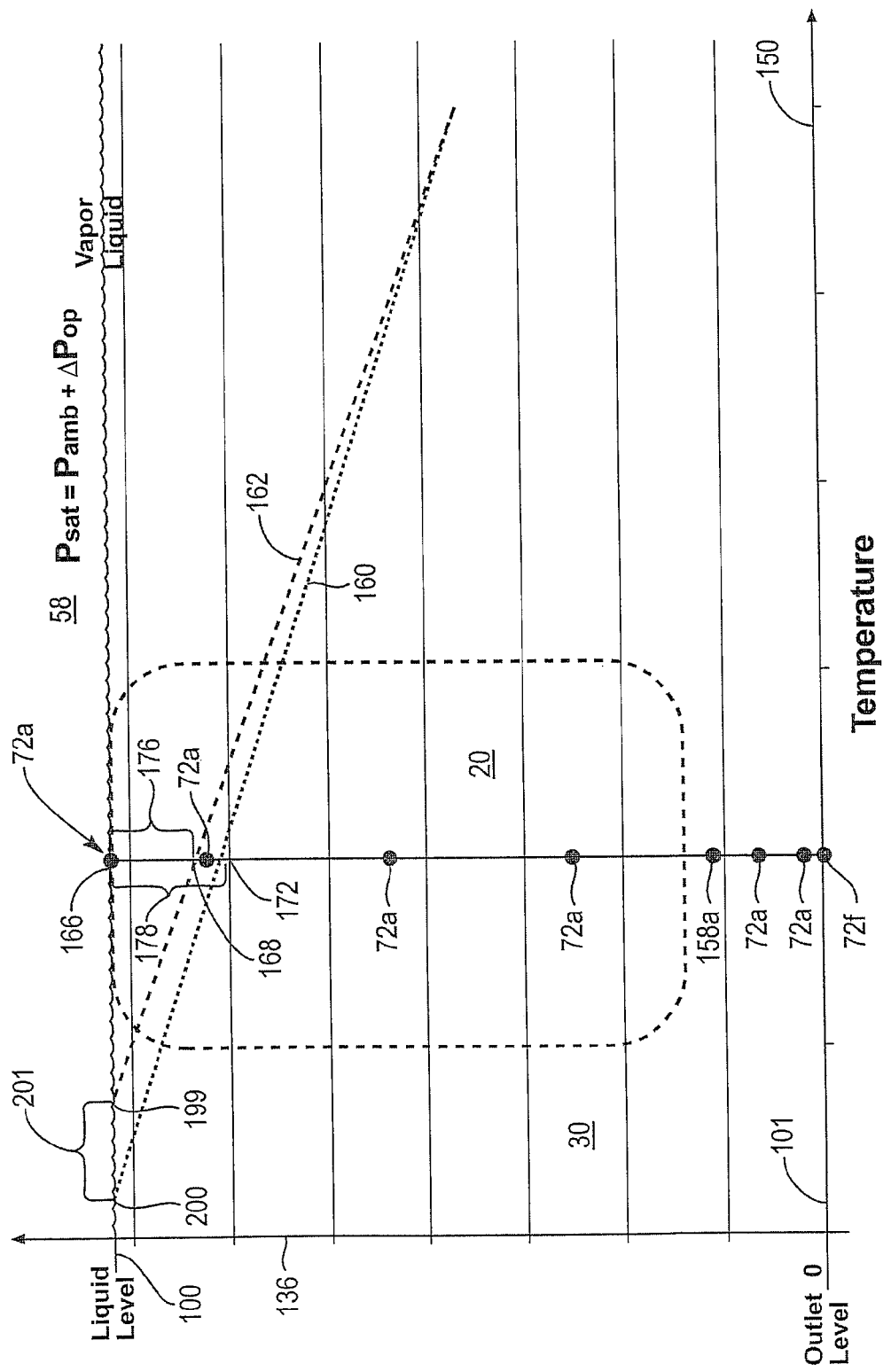
FIG. 11 a chart showing the temperature of saturation in the experiment of FIGS. 9-10, and compared with the expected performance of a conventional, completely mixed heat exchange system.

Referring to FIG. 11, a chart 198 illustrates the effect on temperature along the temperature axis 150 at various levels of depth illustrated on the axis 136. Temperatures are not normalized to a non-dimensional form as with other figures. Here, the saturation temperature curves 160, 162 correspond to those of FIG. 7A. These values reflect actual data from the experiments 194 corresponding to FIGS. 9-10. Here, the point 199 represents the saturation temperature at the surface 100 or the liquid level 100 in the tank 30. The conditions at the point 199 constitute the saturation temperature at the liquid level 100 for a fully mixed tank. This corresponds to the conditions of the curve 162.

Similarly, the point 200 represents a saturation temperature at the pressure in the plenum 58 above the liquid level 100. Likewise, saturation conditions at the liquid level 100 along the curve 162, the point 200 corresponds to the curve 160 of a saturation temperature existing at the pressure in the plenum 58 for a dynamic gradient configuration of FIGS. 9-10.

The empirical data of FIG. 11 confirm the operational characteristics discussed with respect to FIG. 7A. For example, the region 176 corresponds to the description of the region 176 with respect to FIG. 7A. Likewise, the region 178. Similarly, the region 180 of FIG. 7A is the difference between the depth of the region 176 and the region 178.

This represents the advantage in heat transfer area and greatly multiplied heat transfer coefficient in the region of nucleate boiling in the core. The core 20 is illustrated by dotted line surrounding a region reflecting the actual depth and position of the core 20 in the tank 30 during the experiments 194.

Figure 12:
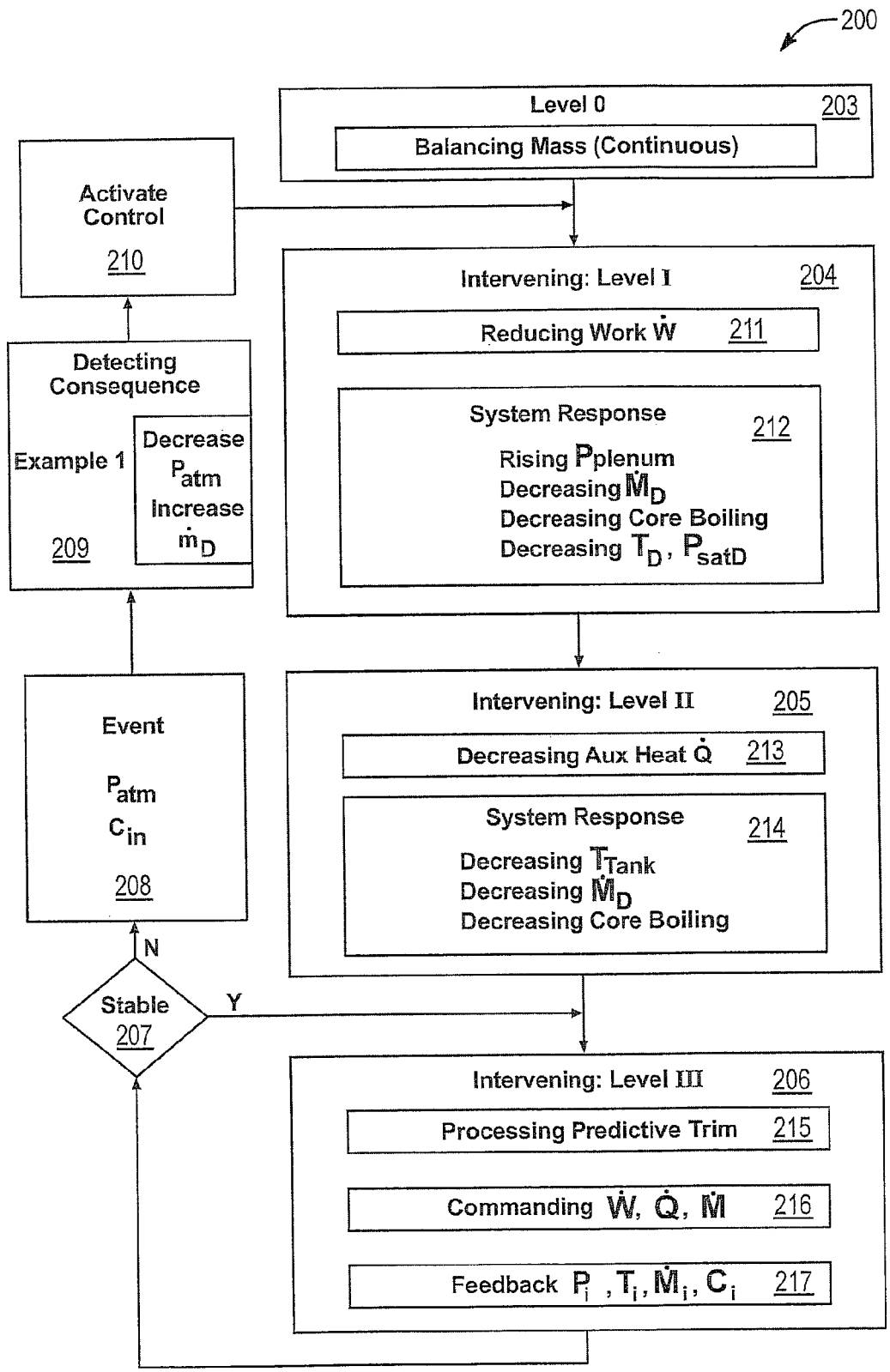
FIG. 12 is a schematic block diagram of a method of controlling the system of FIGS. 1-11, in accordance with the levels of control illustrated in FIGS. 2A-2B.

Referring to FIG. 12, while continuing to refer generally to FIGS. 1-12, a process 202 for controlling an apparatus 10 in accordance with the invention may have several levels of control. For example, a zero level 203 represents balancing mass by a continuous process of tracking and adjusting the levels of liquid in the tank 30 and in the distillate reservoir 48. These are directly observable and adjustable timely by conventional measurement and control techniques.

Meanwhile, a level one control 204 as well as a level two control 205 and a level three control 206 are illustrated. Level one control 204 involves control of the work done by the compressor 50. In the illustrated process 202, level one is seen as intervening 204 in the operation of the process 202 operating in the system 10.

A principal mechanism for control is reducing 211 or otherwise changing 211 the work done by the compressor 50 in removing vapor 27 from the plenum 58. Typically, the reducing 211 operation corresponds to a control intervention 204 initiated in response to an undesired rise in the liquid level of the reservoir 43 containing distillate. A change 211 in the work done by the compressor 50 causes a response 212 in the system 10. For example, reducing 211 the work done by the compressor 50 causes a rising pressure in the plenum 58. Likewise, a decreasing mass flow rate will result through the compressor and out of the plenum 58. This is somewhat counterintuitive.

For example, decreasing 211 or reducing 211 the work done by the compressor backs up pressure in the plenum 58, causing core boiling to decrease and decreasing the distillate temperature and saturation pressure. These system responses 212 result in a readjustment of the operation point of the system 10. Specifically this alters the pressure in the plenum 58, thereby forcing a readjustment of saturation pressure and saturation temperature in the brine 23.

As a practical matter, the process 202 illustrated in FIG. 12 is an example of controlling the system 10. Accordingly, the most responsive element for controlling operation of the apparatus 10 or system 10 is the level one control 204.

Level two control 205, or intervening 205 in the level two control scheme, involves adjusting 213 the auxiliary heat provided by the auxiliary heater 70. In this example, adjusting 213 is embodied in decreasing auxiliary heat output by the auxiliary heater 70. This may be done by controlling the heater 70 or the auxiliary heat source 46.

By decreasing 213 auxiliary heat, intervening 205 follows the more rapid and responsive 211 of the intervention 204. However, in intervening 205 at level two control, the decrease 213 in auxiliary heat results in a much slower response of the system. This includes a decreasing temperature in the tank, decreasing mass flow rate of the distillate 25, and decreasing core boiling.

The temperature 158a is moved to the left in FIG. 11. However, an excursion away from the curve 162 will typically occur as a system response 212. By decreasing 213 the auxiliary heat, the temperature line 158a moves to the left, corresponding to a net cooling of the tank 30. The result of moving the line 158a to the left is a decrease in the region 176 and an increase of the region 180 between the regions 176, 178.

Perhaps the most significant effect of moving the temperature or decreasing 213 the heat with its corresponding decrease in the temperature 158a is to reduce the region 178, by shifting the position of the intersection point 172 at which the temperature line 158a intersects the curve 160. Thus, less of the core 20 is involved in boiling. Accordingly, a decreasing mass flow rate and a decreasing core boiling will occur as system responses 214 in accordance with FIG. 12.

Intervening 206 at the level three control, as described in reference to FIG. 2B, may involve processing 215 by a computer processor in order to provide a predictive trim to the other levels of control. Accordingly, the controller 84 may receive signals from any or all of the sensors 72. It may provide instructions commanding 216 modifications to the work, heat, or, optionally, mass flow rates in the system.

Commanding 216 an alteration to these independent control variables may result in alteration of the dependent variables. Accordingly, feeding 217 data back or providing 217 feedback of values of pressure, temperature, mass flow rate, concentration, or the like will reflect the dependent variables on which the independent variables of work and heat are controlling.

In certain embodiments of an apparatus in accordance with the invention, and a method 202 in accordance therewith, intervening 206 at level three control may involve numerical methods implemented to predict and stabley step the commands 216 to set points that are expected, projected, predicted, or otherwise calculated to secure proper values of the dependent variables of pressure, temperature, mass flow rates, and concentration at any particular point within the system 10.

Upon the intervening 206, the system, and particularly the controller 84, may render a decision 207 on whether or not the system 10 is stable. If the system 10 is stable, continuing intervention 206 of the level three control may involve trimming in a predictive fashion any independent variable necessary. However, if the decision 207 is that the system 10 does not appear to be entirely stable, the process 202 may advance to detecting 209 an event 208 responsible.

For example, if the system 10 does not appear stable, certain events 208 are occurring that may be the effect of atmospheric pressure, change in concentration in the input flows 35a, or the like. Any drifting of the system 10 away from the predictive trim control of the intervention 206 will typically be a result of an event 208 altering the condition of the system 10.

Accordingly, detecting 209 the consequences will typically involve feedback 217 from sensors of pressure, temperature, mass flow rate, concentration, a combination thereof, or the relationships therebetween. For example, the system may encounter a decrease in atmospheric pressure Likewise, the system 10 may detect an increase in mass flow rate of distillate. In this example, these changes will be detected by sensor 72 and reported back to the controller 84 as data inputs, reflecting consequences of the event 208. Following detecting 209 these consequences, activation 210 of the control through the controller 84 is appropriate. The level zero control 203 is left out of the control loop of the process 202 for purposes of illustration. The level zero control involves control of parameters that can easily be observed, controlled, and immediately affected. Adding liquid through adjustment of the rate of flow through a pump 76b will result in increased flow 35a into the tank 30. Likewise, an increase in the speed of a pump 76d may occur by slaving the control for the pump 76d to the volumetric flow rate, speed, current, or other control mechanism of the pump 76b.

In contrast, determining exactly how much heat should be added to the auxiliary heater 70 is not necessarily an intuitive process and is certainly not directly observable nor controllable manually or by a simple feedback sensor. The time of response for the temperature in the core 20 or the tank 30 is comparatively long (e.g., 4.6 hours), and the responsiveness of the compressor 50 is so fast (seconds), that a measurement on a sensor 72d in the plenum 58 does not necessarily provide an obvious direction for intervention 204, 205 at levels one or two, respectively.

The level zero control may also be trimmed by the intervention 206 at level three. Slight adjustments may be made for losses, miscalculations, calibrations, and the like. However, as a practical matter, the level zero control need not be included in the control loop of the process 202.

One way to consider the intervention 206 at level three control is in terms of predicting what control parameters should be adjusted, and in which direction they should be adjusted, based on an algorithmic prediction of where the system needs to move, so to speak. Thus, rather than simply tracking a dependent variable and adjusting a single independent variable, the predictive trim control intervention 206 is very much a sophisticated function reflecting the sophisticated interrelationships between heat and mass transport within the system 10 and among its many components.

Another way to think of the control process 202 is with zero level of control 203 maintaining a mass balance according to the first law of thermodynamics. The mass within a system must be the mass flowing in less the mass flowing out.

Likewise, the intervention 204 at the level one control represents an energy balance. That is, modifying 211 the work being input as the primary energy source in the operation of the system 10. That is, heat from the auxiliary heater 70 does not operate the system 10. Power or work by the compressor 50 operates the system 10 and makes up the energy losses required by the thermodynamic cycle thereof.

Intervention 205 at the level two control actually is not a principle control of the system 10. Rather, intervening 205 by adjusting 213 auxiliary heat is a mechanism for adjusting the operational parameters of the system 10 in accordance with outside effects.

For example, if a storm front rolls in, then atmospheric pressure will decrease. Since the tank 30 is not sealed as a pressure vessel, the pressure in the plenum 58 may track ambient or atmospheric pressure. A pressure drop in the plenum 58 may easily be larger than the temperature differential being controlled above atmospheric in the plenum 58.

Thus, intervening 205 at level two involves adjusting the temperature of the tank brine 23 in order to adjust the overall operation of the system 10 to changing outside conditions. Intervening 205 at level two may be resetting the system to adjust to a new steady state of operation within its environment. Environment cannot be controlled by the system. Rather, the system 10 must adjust to its environment and does so by the intervention 205. Therefore, intervention 205 is prospective to the extent that it is initiated as a result of intervening 204 at level one. However, it may still be directed to readjusting the parameters of the system 10, so the system 10 may arrive timely at a new and future equilibrium and steady state condition.

Thus, intervening 206 at level three of control is almost entirely predictive. All the lower levels of control are considered and the operational characteristics are modeled in order to determine the nonobvious set points to which independent variables must be set. Dependent variables thereby arrive at their steady state and proper conditions, in the most effective and timely manner.

Thus, each of the levels including intervention 203 at level zero, intervention 204 at level one, intervention 205 at level two, and intervention 206 at level three abstract the control by the controller 84. Control moves further from direct values of measurable parameters, and away from direct response to current conditions.

Another way to think of this control process 202 is with level zero effectively independent closed loop control of a mass balance directly, direct control of the value. Intervening 204 at level one is asserting control over an independent variable directly, and the dependent variable indirectly, by a change in work.

Meanwhile, intervening 205 at level two involves addressing the parameters that affect the rate of change and the direction of change, rather than affecting the observed variable itself. Finally, intervening 206 at level three involves predicting rates of change of rates of change of parameters to be controlled.

The present invention may be embodied in other specific forms without departing from its fundamental functions or essential characteristics. The described embodiments are to be considered in all respects only as illustrative, and not restrictive. All changes which come within the meaning and range of equivalency of the illustrative embodiments are to be embraced within their scope.

Wherefore, we claim:

1. A method of removing a contaminant from a carrier, the method comprising:
    selecting a liquid operating as a carrier;
    selecting a contaminant found in the carrier to be a targeted contaminant;
    providing a circuit comprising a vapor re-compression cycle having a first region containing nucleate boiling;
    introducing into the circuit the carrier containing the contaminant;
    establishing in the first region a concentration gradient of the contaminant;
    controlling the first region by manipulation of the concentration gradient; and
    returning a condensate comprising the carrier containing less than a pre-determined concentration of the contaminant.

2. The method of claim 1, wherein:
    the method further comprises returning from the first region a brine;
    at least one of the condensate exiting the cycle and a vapor within the cycle is substantially devoid of the contaminant; and
    providing from one of the condensate, vapor, and brine a feedstock for a subsequent unit operation.

3. The method of claim 2, wherein the feedstock provides at least one of:
    a precursor for a chemical reaction in the subsequent unit operation;
    a fluid having independent economic value in a first market;
    a constituent, derivable from the fluid, and having independent value in a second market;
    the fluid reusable directly for recycling in a source process providing the carrier to the circuit;

an increased operational efficiency for a disposition process disposing of the feedstock; reduction of environmental impact of the contaminant; and improvement in a compliance process in satisfaction of at least one of a governmental regulation, industry standard, health standard, safety standard, and a contractual requirement.

4. The method of claim 3, wherein the subsequent unit operation is selected from synthesis of hydrochloric acid, synthesis of another acid, hydrolysis, electrolysis, an ion exchange operation; an osmotic separation process, a vaporization separation process, coagulation, other chemical separation process, centrifugation, filtration, sluicing, settling, flocculation, and another mechanical separation process, microwave separation, another microwave treatment, re-injection into a well, a geologic fracturing operation, blending with another material, reacting chemically with another material.

5. The method of claim 4, wherein the contaminant comprises at least one of a dissolved solid, suspended solid, hydrocarbon, salt, heavy metal, other metal, volatile organic compound, other organic compound, oxide of nitrogen, other nitrogenous compound, alcohol, oxide of sulfur, other sulfurous compound, calcium compound, halide, other ion, acid, and base.

6. The method of claim 5, wherein providing the circuit comprises providing modules for effecting the circuit.

7. The method of claim 6, wherein the method further comprises:

providing a specification defining a system having a plurality of the modules, each module thereof implementing an instance of the circuit, and containing the circuit unit operations corresponding thereto;

sizing the system to match a source of the contaminant; and providing the plurality of modules, operating together as the system, the number of modules therein being selected based on an output from the source.

8. The method of claim 6, wherein the method further comprises:

providing a requirement, pre-determined and corresponding to a source of the contaminant;

defining a system having a plurality of the modules, each module thereof having a type and implementing at least one function specified by the requirement;

selecting a value representing a number of modules of each type to be included in the system as selected components;

configuring the system by connecting the selected components.

9. The method of claim 6, wherein each module of the modules is mounted on a connecting structure and sized to be commercially transportable in accordance with transportation limitations provided by regulation.

10. The method of claim 9, further comprising assembling a facility in a pre-determined configuration by connecting the connecting structures to one another and rendering the modules interoperable.

* * * * *